Figure 12:
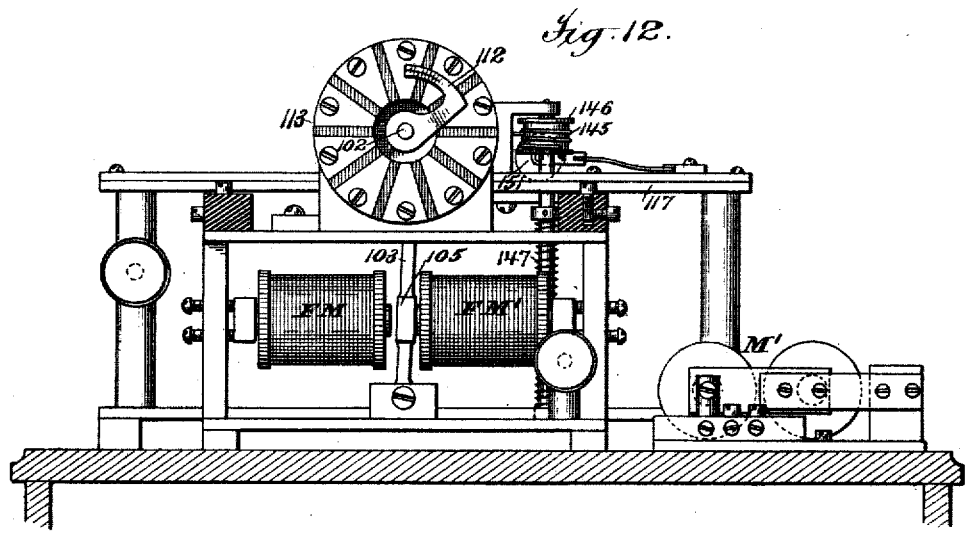

No. 788,800. PATENTED MAY 2, 1905.
W. TRAFFORD.
TELEGRAPHY AND TELEGRAPH APPARATUS.
APPLICATION FILED MAR. 15, 1897.
9 SHEETS—SHEET 1.
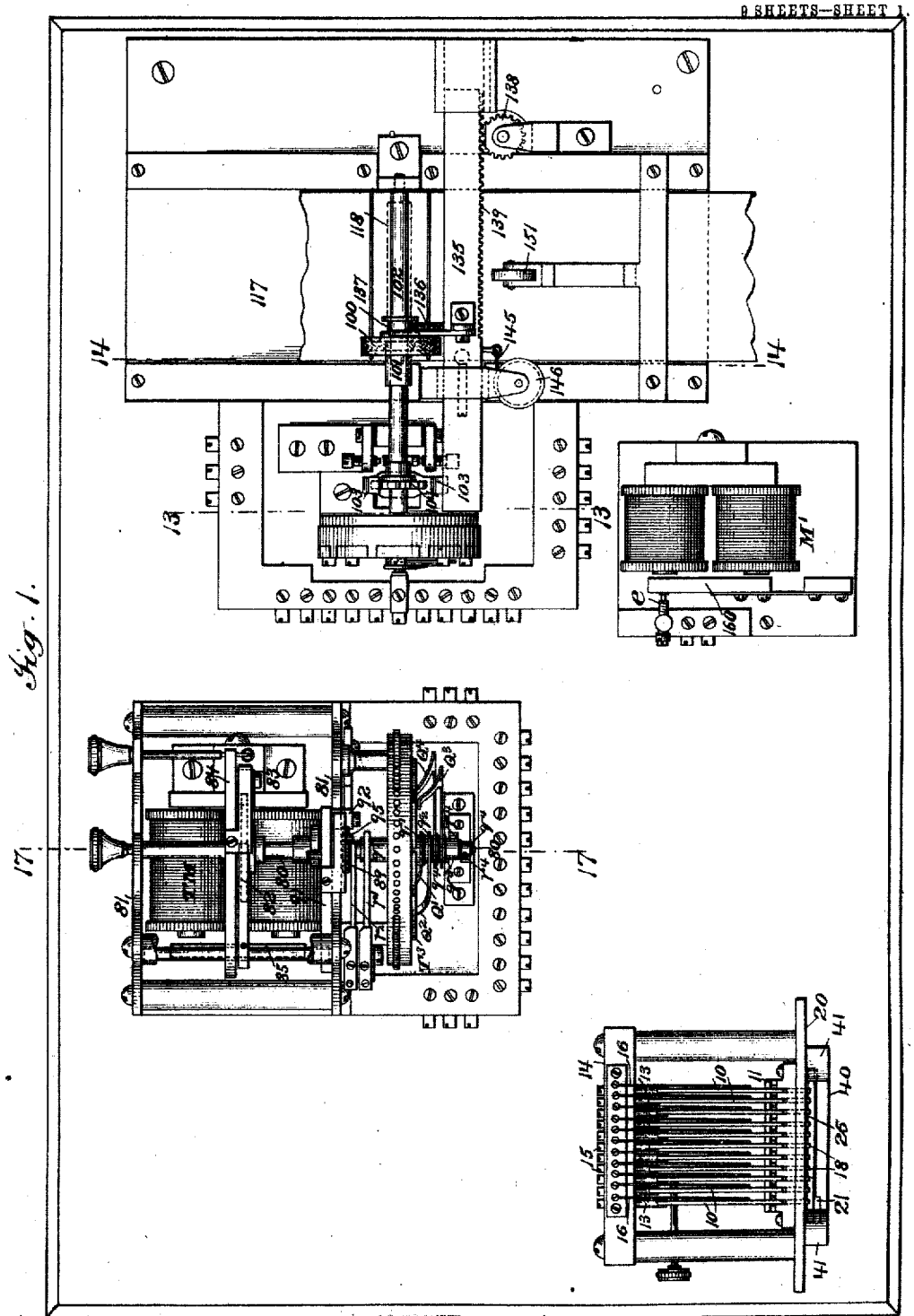

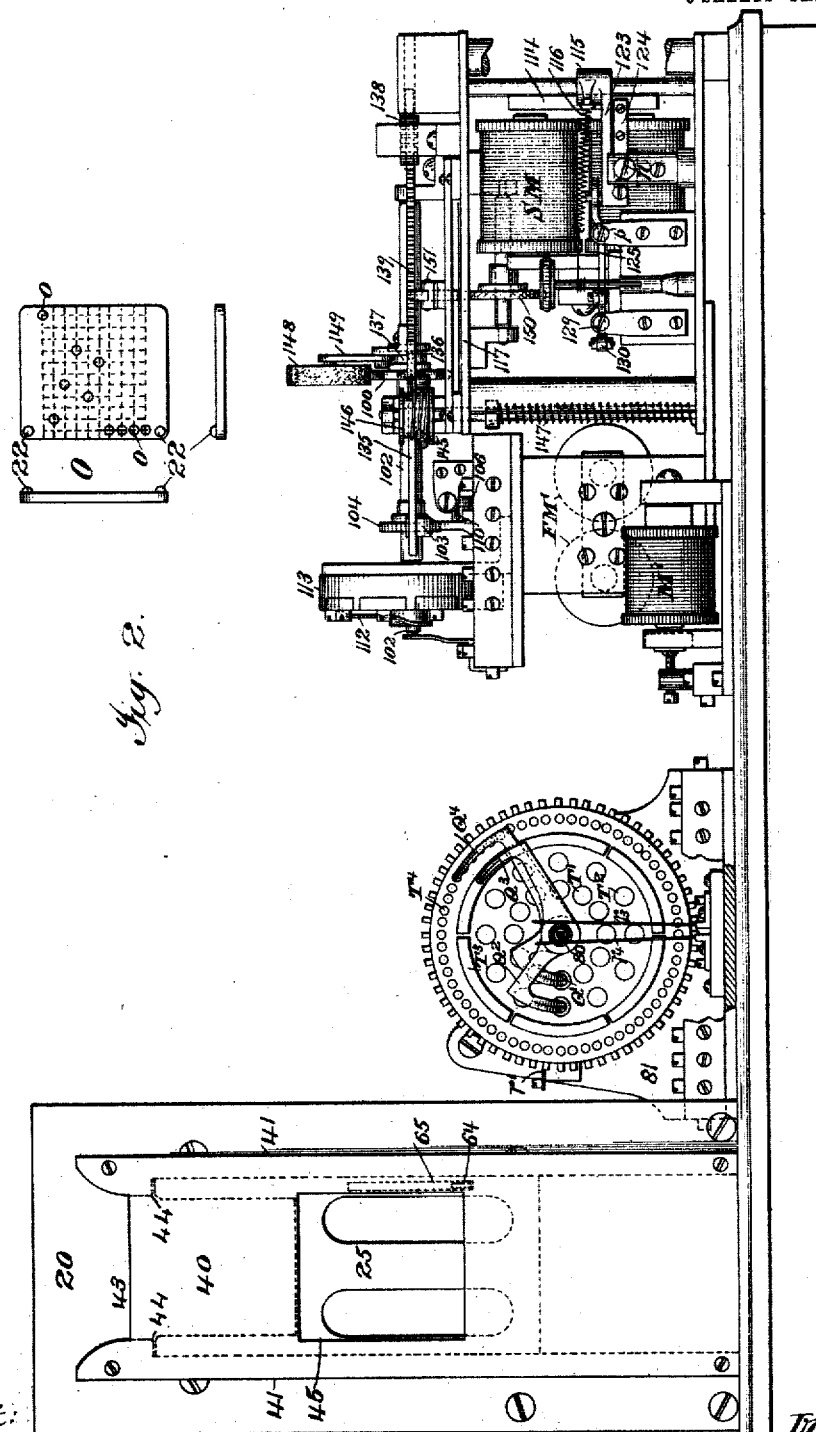

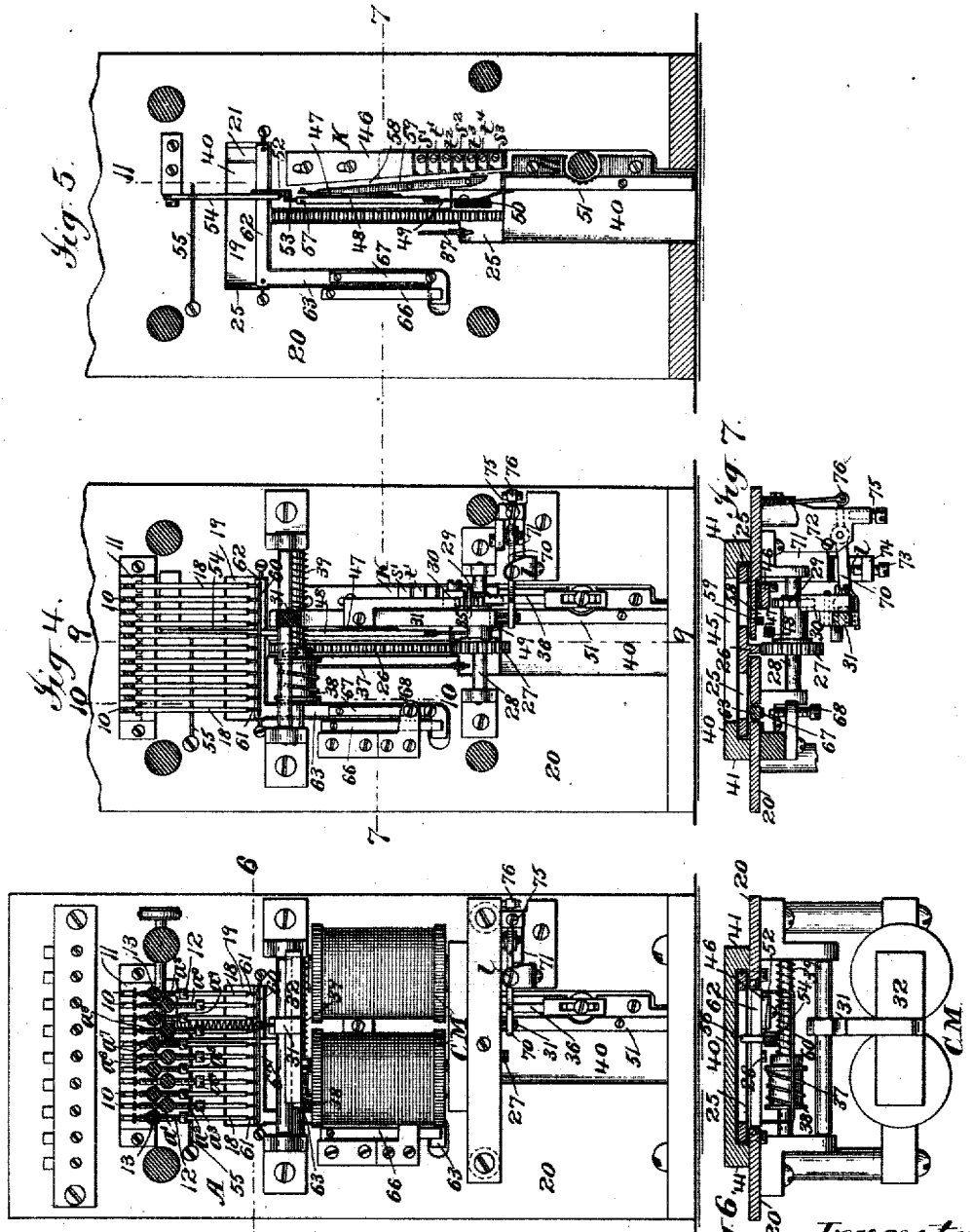

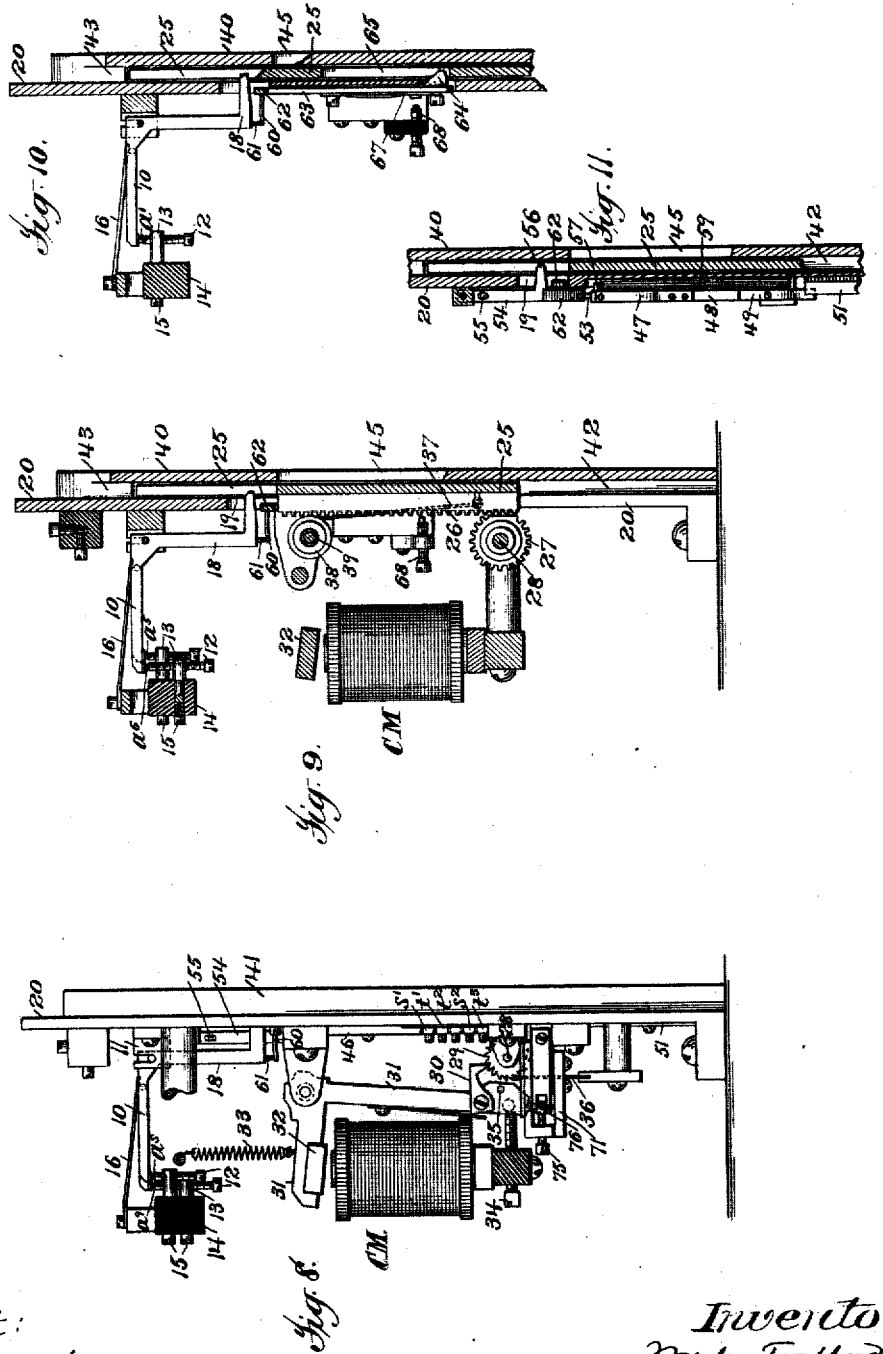

No. 788,800. PATENTED MAY 2, 1905.
W. TRAFFORD.
TELEGRAPHY AND TELEGRAPH APPARATUS.
APPLICATION FILED MAR. 15, 1897.

9 SHEETS—SHEET 5.

Attest.
A. L. Kent
O. F. Kehoe.

Inventor:
Wesley Trafford
By Philipp Mauro Phelps
Attys

No. 788,800. PATENTED MAY 2, 1905.
W. TRAFFORD.
TELEGRAPHY AND TELEGRAPH APPARATUS.
APPLICATION FILED MAR. 15, 1897.

9 SHEETS—SHEET 6.

Attest:
A. L. Kent
O. F. Kehoe

Inventor:
Wesley Trafford
By
Philipp Mauro Phelps
Attys

No. 788,800. PATENTED MAY 2, 1905.
W. TRAFFORD.
TELEGRAPHY AND TELEGRAPH APPARATUS.
APPLICATION FILED MAR. 15, 1897.
9 SHEETS—SHEET 7.
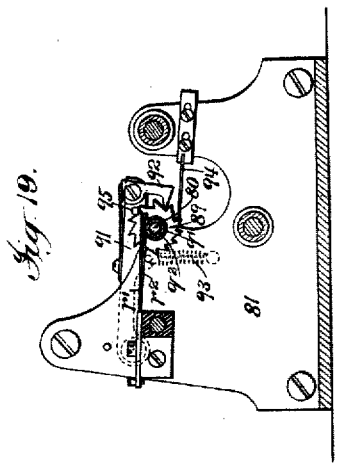
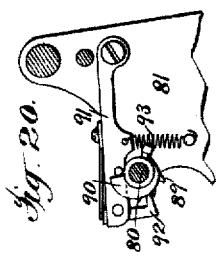
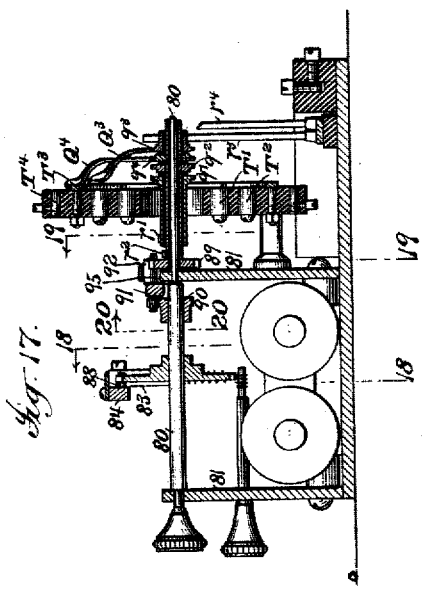
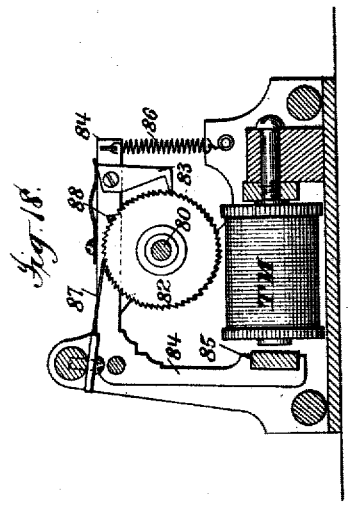
Attest:
A. L. Kent
J. F. Kehoe
Inventor:
Wesley Trafford
By
Philipp Mauro Phelps
Attys No. 788,800. PATENTED MAY 2, 1905.
W. TRAFFORD.
TELEGRAPHY AND TELEGRAPH APPARATUS.
APPLICATION FILED MAR. 15, 1897.
9 SHEETS—SHEET 8.
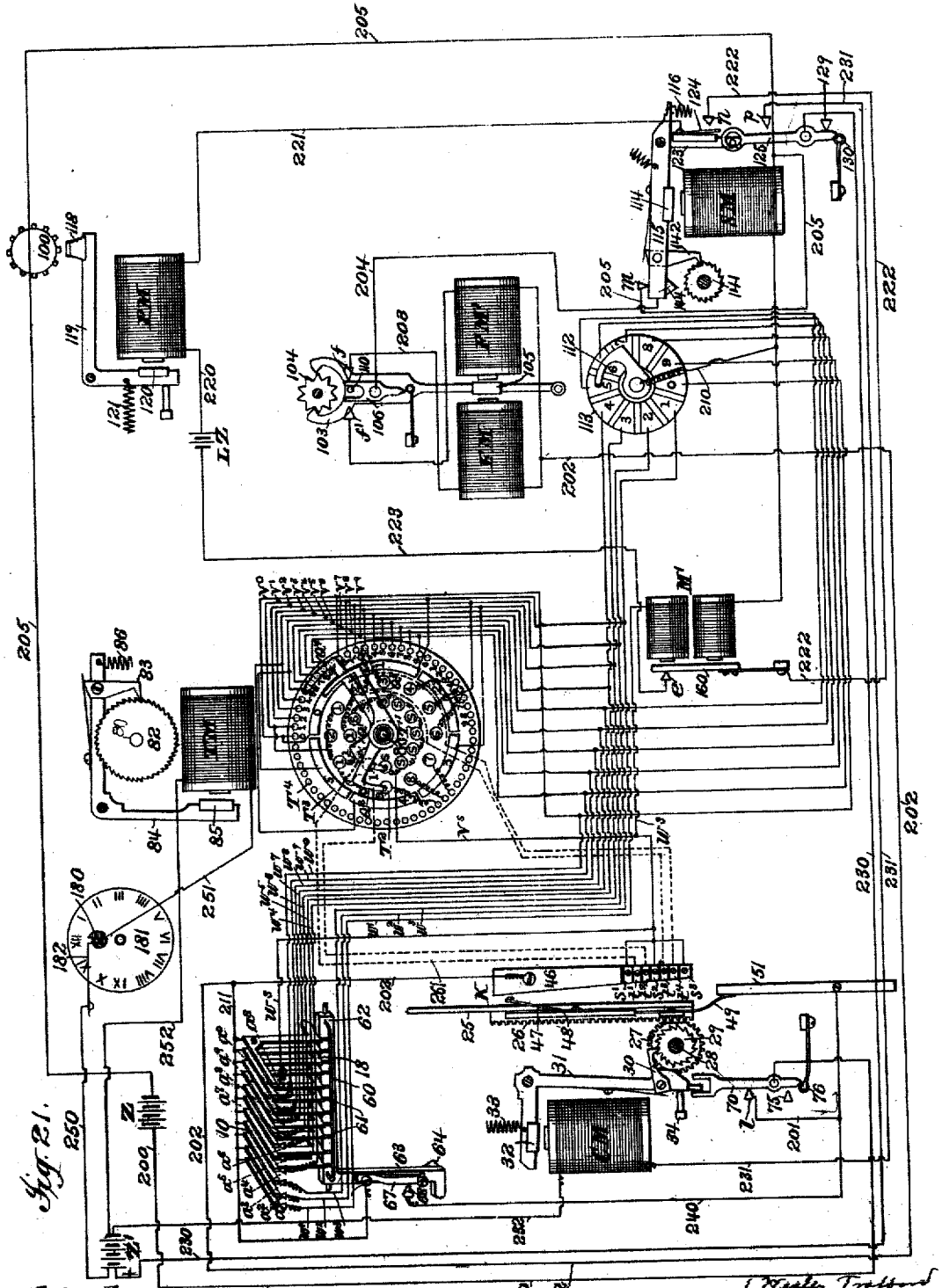

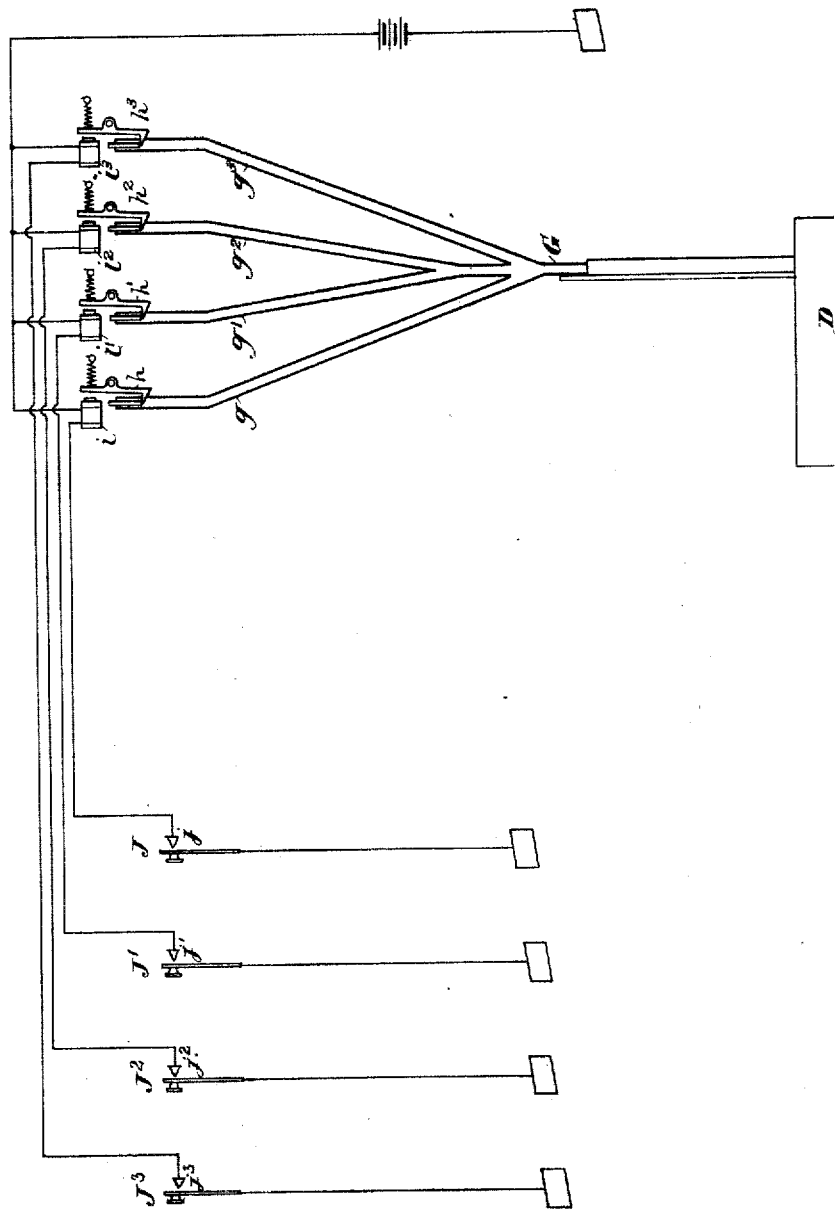

No. 788,800.

Patented May 2, 1905.

UNITED STATES PATENT OFFICE.

WESLEY TRAFFORD, OF NEW YORK, N. Y.

TELEGRAPHY AND TELEGRAPH APPARATUS.

SPECIFICATION forming part of Letters Patent No. 788,800, dated May 2, 1905.

Application filed March 15, 1897. Serial No. 627,518.

*To all whom it may concern:*

Be it known that I, WESLEY TRAFFORD, a citizen of the United States, residing at New York, county of New York, and State of New York, have invented certain new and useful Improvements in Telegraphy and Telegraph Apparatus, fully described and represented in the following specification and the accompanying drawings, forming a part of the same.

This invention relates to electric-telegraph systems and apparatus of that class in which a record is made by printing or otherwise recording the desired characters on paper or other suitable material and known generally as "printing-telegraphs."

The object of the invention is to provide an improved system and apparatus of this class, and more especially to provide an improved electric register or recorder system and apparatus by which a number or amount to be recorded will be printed or otherwise recorded on, preferably, a strip or ribbon of paper and accompanied by a printing of the time at which the record is made, and, further, to provide an improved construction and arrangement whereby on the actuation of the transmitting portion of the apparatus for the making of a record the apparatus will operate automatically to cause the printing of all the figures or other characters of the record, including the time, so as to produce a clear readable record.

An apparatus embodying all the features of the invention includes a transmitting mechanism whereby electrical impulses corresponding to the information to be recorded are sent to the receiver and a receiving mechanism whereby the impulses sent by the transmitting mechanism are caused to produce their proper record.

For the purpose of controlling the operation of the transmitter in so far as the sending of the impulses for causing the printing of the number or amount is concerned I preferably employ checks of suitable form which are characterized according to the number to be recorded by the receiver in a suitable manner according to the construction of the transmitter. The transmitter is provided with a series of contact-fingers for sending the impulses which determine the figures or other characters to be printed by the receiver, these contact-fingers being controlled in the operation of the transmitter by a check carried by a suitable carriage past the contact-fingers, said check being provided with suitable devices arranged to successively move the proper contact-fingers as it is moved past the series for the transmission of impulses for causing the recording of the number or amount to which the check corresponds.

The transmitting mechanism preferably includes also a time commutator or switch having, preferably, four series of contacts corresponding, respectively, to the first and second figures for hours and the first and second figures for minutes. After the sending of the impulses for producing the record corresponding to the particular check employed the transmitter continues its operation to make and break contact for the purpose of sending impulses successively to four contact springs or trailers making contact, respectively, with the four series of contacts of the time-commutator, whereby successive circuits are completed for the printing of the proper figures, according to the hour and minute to be recorded by the receiving mechanism.

The receiving mechanism is preferably constructed to print from a type-wheel having the figures or other characters to be printed on its periphery, suitable mechanism being provided for positioning the type-wheel to secure the printing of the desired characters. For this purpose there is preferably provided a suitable motor which is caused to operate to rotate the type-wheel on the closing of a circuit by the transmitting mechanism. The rotation of the type-wheel is stopped when the type-wheel has been moved into position for the printing of the character corresponding to the impulse sent from the transmitter by the completion of a circuit to a magnet through a segment of a sunflower corresponding to the impulse sent from the transmitter by contact with said segment of a trailer rotating with the type-wheel, the energizing of said magnet causing the stopping of the rotation of the type-wheel, as by causing the circuit to an electric-motor mechanism by which the type-wheel is rotated to be broken.

The receiver includes also a printing or impression mechanism for bringing the type and the paper into contact after the positioning movement of the type-wheel and a spacing mechanism for advancing the paper or the type-wheel after each impression or for spacing and preferably also a paper-feeding mechanism for advancing the strip of paper longitudinally after the completion of the printing of each line. In the preferred form of apparatus the spacing mechanism is controlled by the movement of the armature of the magnet above referred to, the movement of this armature also causing a local circuit to be closed to a magnet controlling the printing or impression mechanism.

I avoid all difficulty due to necessity of securing synchronism of movement in the transmitting and receiving mechanisms by so arranging the electrical connections that the successive steps in the operation of the transmitter and the successive steps in the operation of the receiver shall be mutually dependent each on the completion of a step in the operation of the other. This result is secured by arranging in the circuit to the magnet of the transmitter controlling the check-carriage feed a contact maker and breaker controlled by the armature of the spacing-magnet of the receiver, the armature of the carriage-feed magnet in turn operating a contact maker and breaker in the circuit to the spacing-magnet and to the motor, and by arranging these contact makers and breakers so that they will act only just before the end of the movements in either direction of the armatures by which they are actuated, as will more fully hereinafter appear.

By the above arrangement also I provide for the automatic operation of the apparatus for the making of the complete record after the apparatus has once been started.

A full understanding of the various features of the invention as above generally outlined and of other features contributing to the successful operation of the apparatus can best be given by a detailed description of an apparatus embodying the various features of the invention, and such a description will now be given in connection with the accompanying drawings, illustrating the preferred form of apparatus embodying the invention, in which—

Figure 13:
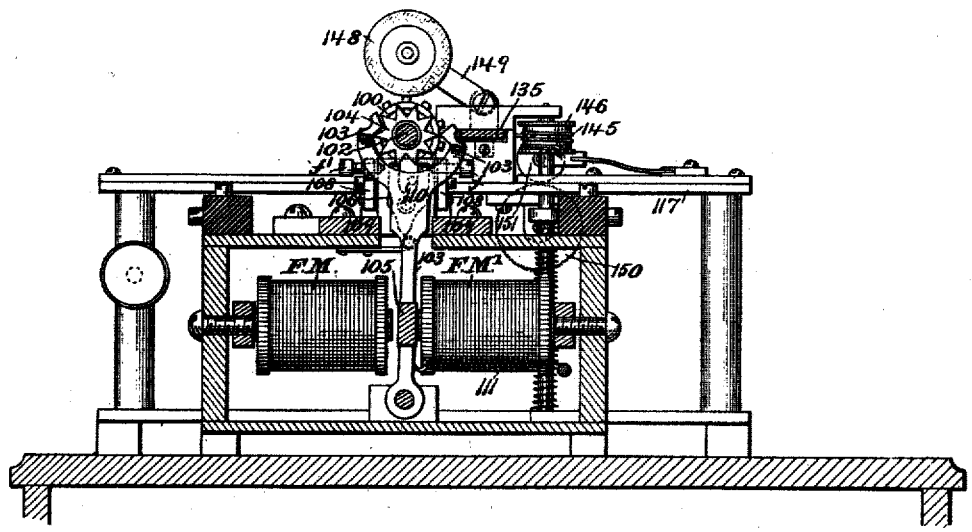
Figure 14:
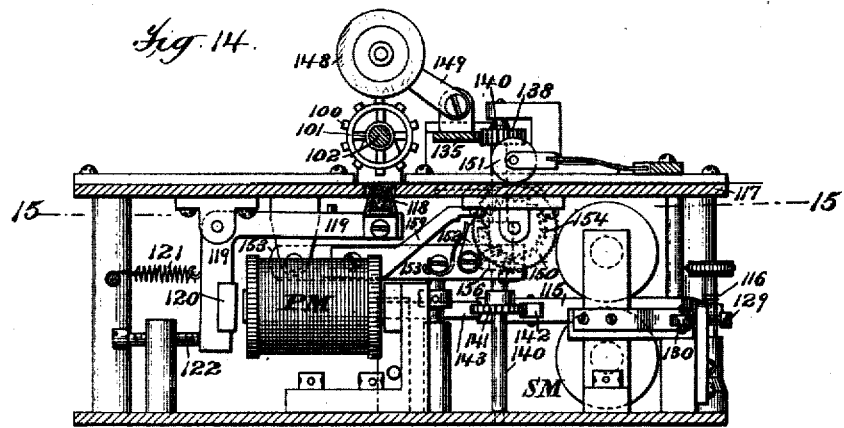
Figure 15:
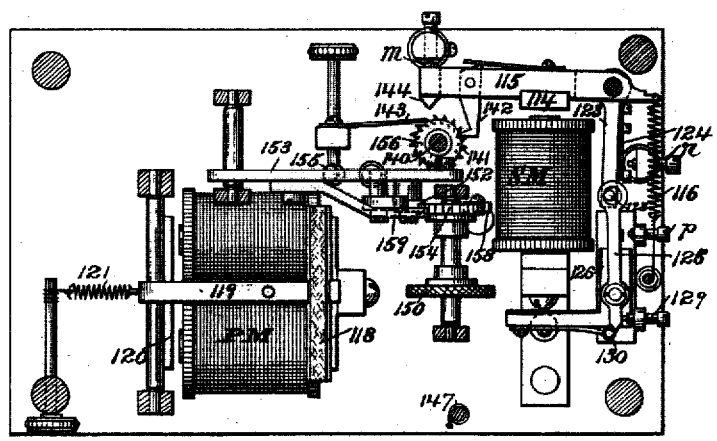
Figure 16:
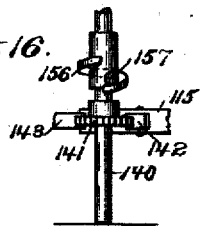

Figure 1 is a plan view of the apparatus, the electrical connections being omitted. Fig. 2 is a front elevation. Fig. 3 is a rear elevation of the transmitting mechanism. Fig. 4 is a similar view with parts removed. Fig. 5 is a similar view with more parts removed. Fig. 6 is a section taken on line 6 of Fig. 3. Fig. 7 is a section taken on line 7 of Figs. 4 and 5. Fig. 8 is a side view of the transmitting mechanism, part of the supporting-framework being broken away. Fig. 9 is a section taken on line 9 of Fig. 4. Fig. 10 is a section taken on line 10 of Fig. 4. Fig. 11 is a section on line 11 of Fig. 5. Fig. 12 is a side view of the receiving mechanism looking toward the right in Fig. 1. Fig. 13 is a section taken on line 13 of Fig. 1. Fig. 14 is a section taken on line 14 of Fig. 1. Fig. 15 is a section on line 15 of Fig. 14. Fig. 16 is a detail of a portion of the paper-feeding mechanism. Fig. 17 is a central longitudinal section of the time-commutator as on line 17 of Fig. 1. Fig. 18 is a section on line 18 of Fig. 17. Fig. 19 is a section on line 19 of Fig. 17. Fig. 20 is a detail sectional view taken on line 20 of Fig. 17. Fig. 21 is a diagrammatical view showing the electrical connections and such of the operating parts as are necessary to make such connections clear. Fig. 22 shows one of the operating-checks in face, side, and end view. Fig. 23 is a diagrammatical view showing an application of the invention as a watchman's recorder.

In the drawings the transmitting and receiving mechanisms are shown as arranged in close proximity to one another, so as to form a single compact apparatus. It will be understood that while such an arrangement is in many cases desirable, yet it is not essential and that the transmitting and receiving portions of the apparatus may be located at points more or less distant from one another as the use to which the invention is put demands.

The mechanical features of the apparatus will first be described in detail with only such reference to the electrical connections as is necessary to give an understanding of the purpose and operation of such mechanical parts.

The transmitting portion of the apparatus consists of the transmitter proper and the time-commutator.

Referring first to the transmitter proper, (shown in Figs. 1 to 11,) it includes a series of contact-fingers 10, pivoted in a support 11 and making contact at their outer ends with a series of contacts $a'$ $a^2$ $a^3$ $a^4$ $a^5$ $a^6$ $a^7$ $a^8$ $a^9$ $a^0$ $a^s$, these contacts being preferably adjustable, as by being formed of screws 12, carried by studs 13 in a supporting-bar 14, of insulating material, said studs 13 extending through the bar 14 and being provided at their outer ends with binding-screws 15. The fingers 10, as shown, are spring-pressed by springs 16 to make contact with the screws 12. Each of the contact-fingers 10 is provided with a downwardly-extending arm 18, the lower ends of which arms are formed to extend forward through an opening 19 in the supporting-plate 20, so that when the contact-fingers make contact with the screws 12 the ends of the arms 18 will extend just beyond the front side of the plate 20.

Mounted to move vertically on the front side of the supporting-plate 20 is a carriage 25 for the operating-checks O, said carriage being formed of a plate having its upper end cut away to receive the operating-check and carrying a rack 26, with which engages a pinion 27. The pinion 27 is carried by a spindle 28, which spindle also carries a ratchet-wheel 29, with which engages a spring-pressed pawl 30, carried by one arm of a bent lever 31, the other arm of which carries an armature 32 in position to be attracted by an electromagnet CM, said lever 31 being under tension by spring 33 to return to its normal position, as shown in the drawings, this return movement being limited by an adjustable stop 34. Thus when the magnet CM is energized the pawl 30, acting on the ratchet-wheel 29, will rotate the spindle 28 and pinion 27, and the carriage 25 will be thereby caused to move downward one step, and when the magnet is deënergized the armature 32 will be released and the lever 31 moved under the action of the spring 33 to carry the pawl 30 back to engage the next tooth of the ratchet-wheel 29, so as to be in position to cause a second movement of the pinion 27 when the magnet is again energized. A pin 35, carried by the lever 31, serves to engage the ratchet-wheel 29 on the forward movement of the lever to prevent overthrow of the ratchet-wheel, and a retaining-spring 36 engages the ratchet-wheel to hold it against reverse movement on the return movement of the pawl 30. The check-carriage will thus be fed downward step by step as the carriage-feed magnet is successively energized and deenergized. The pinion 27 is cut away on one side, as shown, for the purpose of allowing the return of the carriage when its downward movement has been completed, this return movement of the carriage being preferably accomplished by means of a cord 37 wound on a drum 38 under tension of a spring 39.

Any suitable means may be provided for guiding the carriage in its movement on the plate 20; but I prefer to provide for this purpose a plate 40, having side flanges 41 of the proper depth and the proper distance apart, so that when the plate 40 is secured in position with these flanges abutting against the supporting-plate 20 there will be formed a channel 42 of the proper size to hold the carriage in position and free to slide vertically against the plate 20. The upper end of this channel forms a receiving-slot 43 for the operating-checks. The upward or return movement of the carriage is limited, as by shoulders 44 formed on the side flanges 41 of the plate 40.

The operating-checks O consist in the preferred form of a rectangular plate of any suitable material, but preferably of metal on account of its weight and strength, this plate being provided with finger-operating devices, preferably in the form of openings $o$, arranged according to the number to be recorded. Each of these openings is arranged in one or another of eleven positions horizontally of the plate, these eleven positions corresponding, respectively, to the eleven contact-fingers 10 and being represented in Fig. 22 by the vertical dotted lines in said figure. The position of the openings vertically of the plate is determined by the position in the record of the figure corresponding to the impulse sent by the contact made by the finger controlled by said opening, or, in other words, the openings are arranged successively in the order in which they are intended to control the operation of the contact-fingers at different distances from the bottom edge of the plate corresponding to the step-by-step movement of the carriage, these positions being represented in Fig. 22 by the horizontal dotted lines in said figure.

When one of the checks O is inserted in the receiving-slot 43 and dropped into position on the carriage 25, the lower end of the check will engage and throw backward the ends of the arms 18, thereby raising the fingers 10 away from the screws 12 and breaking the contacts $a'$ $a^2$ $a^3$ $a^4$ $a^5$ $a^6$ $a^7$ $a^8$ $a^9$ $a^{10}$ $a^x$. The position of the lowermost of the openings $o$, however, is such that when the plate rests in position on the carriage, the carriage being in its uppermost position, as shown in the drawings, such opening will be opposite the lower end of one of the fingers 10, thus allowing this finger to drop back and make contact with its corresponding screw 12. Then as the carriage is moved downward step by step successive openings $o$ in the check will be brought opposite the lower end of the finger corresponding in position with said opening. The successive steps in the downward movement of the carriage will thus bring successive openings $o$ in position opposite the lower ends of the arms of the series of contact-fingers 10 and cause successive contacts for sending the succession of electrical impulses corresponding to the number indicated by the arrangement of the openings in the check, as will be hereinafter more fully explained in connection with the diagrammatic view showing the electrical connections. When by the continued downward movement of the carriage the check O has been moved entirely past the series of arms 18, the check is allowed to escape through a discharge-opening 45 in the plate 40.

For the purpose of insuring the operating-checks being always placed in the channel 42 with the proper edge down and the proper face toward the arms 18 a vertical groove 21 is formed in the inner face of the plate 40 and the checks are provided with one or more projections 22 in position to register with the groove 21 when and only when the check is entered into the channel properly.

The transmitting and receiving portions of the apparatus are normally electrically disconnected by means of a main switch or contact-maker K, which includes a contact-plate 46, secured to the supporting-plate 20 and a contact-spring 47, carried by a metallic bar 48, carried by a spring 49, secured to a block 50 of insulating material on the carriage 25. The spring 49 is extended downwardly to form a contact-spring making contact with a vertical insulated contact plate or bar 51. When the carriage is in its normal or upper position, the contact-spring 47 is held out of contact with the plate 46 by means of a stop 52 engaging a pin 53 in the upper end of the bar 48 and holding the bar against the tension of the spring 49, which with the parts in this position tends to move the bar to cause the contact-spring 47 to make contact with the plate 46. The stop 52, preferably of insulating material, is carried by a pivoted arm 54 under spring tension, as by spring 55, to hold the stop in operative position, which arm 54 carries an offset 56, which extends through the opening 19 in the plate 20 in position to be engaged by the checks O when they are dropped in position on the carriage 25. Whenever a check is dropped into position to cause the operation of the transmitting mechanism, therefore, the arm 54 will be thrown backward to move the stop to release the pin 53, and thereby allow the bar 48 to move under the influence of the spring 49 to carry the spring 47 into contact with the plate 46. The upper end of the bar 48 also carries a forwardly-projecting pin 57, which as the carriage moves downward enters a guiding-slot 58, formed by the edge of the plate 46, and a guide 59, parallel with said edge. The edge of the plate 46 is somewhat inclined, so that by the time the carriage reaches the lower extremity of its movement the upper end of the bar 48 will have been moved to the right in Fig. 5 against the tension of the spring 49, so that as the pin 57 passes below the lower end of the guide 59 the bar 48 will be moved by the spring 49 to the left in Fig. 5 to break contact through spring 47. On the return movement of the carriage the pin 57, being on the outside of the guide 59, will prevent the spring 47 from making contact again with the plate 46 as the carriage approaches its normal position, and the stop 52 having meanwhile returned to its normal position the pin 53 will be engaged by said stop just before the carriage reaches its uppermost position, in which the pin 57 is above the upper end of the guide 59.

By the continued downward movement of check-carriage after the entire series of openings in the check has been moved past the lower ends of the arms 18 of the contact-fingers 10 the spring 47, leaving the lower end of the contact-plate 46, will make contact successively with a series of insulated contacts $s' t' t^2 s^2 t^3 t^4 s^3$ for the purpose of making and breaking circuits for causing the recording of the time in the manner and by the aid of the time-commutator hereinafter described.

For the purpose of holding the contact-fingers 10 out of contact with the contact-screws 12 after the check has passed below the arms 18 there is provided a stop 60, arranged to engage a series of pins 61, extending from the arms 18 of the finger-keys 10. This stop 60 extends rearwardly from a rock-shaft 62, which carries a downwardly-extending arm 63, the lower end of which arm is provided with an offset 64, extending through an opening in the supporting-plate 20 and normally into a slot 65 in the check-carriage, the upper edge of which slot engages the offset 64 at the proper time to throw the arm 63 against the tension of a spring 66 to rock the shaft 62 to move the stop 60 into position in front of the pins 61 just before the arms 18 are released by the check. The arm 63 also carries a contact-spring 67 in position to engage an insulated contact 68 when the arm is thrown to the rear, as above described. The object of this contact-maker will hereinafter appear.

The circuit of the spacing-magnet and motor of the receiver is made and broken for purposes hereinafter described by means of a contact-maker 70. This contact-maker, as shown, is pivotally mounted on an insulated metal plate 71, having a binding-screw 72 for one of the wires of the line making circuit through the contact-maker. When moved in one direction, the contact maker and breaker engages a contact $l$, formed, preferably, by an adjustable screw 73, carried by an insulated bracket 74, and its movement in the opposite direction is limited by an adjustable stop 75, carried by the plate 71. This contact-maker is provided with a forked end, between the prongs of which extends the lower end of the armature-lever 31, the prongs of the fork being such distance apart that they will be engaged, respectively, just before the armature-lever reaches the end of its movement in either direction. By this arrangement the contact maker and breaker will be operated only just before the armature-lever has completed its movement in either direction, so that the circuit in which the contact maker and breaker is included will be broken and made only after the armature-lever has substantially completed its movements due to the energizing and deënergizing of the magnet CM. For the purpose of holding the contact-maker 70 in position to make and break contact, respectively, with the contact $l$ while the end of the armature-lever 31 is moving between the prongs of its forked end there is preferably provided a presser-roll 76, bearing against the pointed end of the contact-maker beyond its pivotal point.

The time-commutator is illustrated in Figs. 1, 2, 17, 18, 19, and 20. It includes a commutator-disk having four series of contacts $T' T^2 T^3 T^4$, through which are sent the impulses for the printing of the first and second figures for hours and first and second figures for minutes, respectively, the contacts of each series being connected to the wires leading to the receiver in a proper manner for securing this result, as will be hereinafter described in connection with the diagrammatical view Fig. 21. For making contact with the contacts of each of the series T' T² T³ T⁴ there are provided spring contacts or trailers Q' Q² Q³ Q⁴, carried by flanged sleeves q' q² q³ q⁴, mounted on a spindle 80, rotatably supported in uprights 81. The sleeves q³ and q⁴, carrying the trailers Q³ and Q⁴, are mounted on the spindle 80, so as to turn therewith, being insulated therefrom and from each other, as clearly shown in Fig. 17 and in Figs. 1 and 2. The sleeves q' and q², carrying the trailers Q'Q², are mounted on the spindle 80, so as to be free to rotate together, but independently of the spindle, and are insulated from the spindle and from each other, as shown in the figures above referred to. The sleeves q³ and q⁴ extend forward to provide bearing-surfaces for contact-springs r³ r⁴, respectively, the sleeve q⁴ extending beyond the end of the sleeve q³ for this purpose. The sleeves q' and q² extend rearwardly through a central opening in the commutator, the sleeve q² extending beyond the sleeve q' to provide bearing-surfaces for contact-springs r' and r². These contact-springs r' r² r³ r⁴ are electrically connected, respectively, with the contacts t' t² t³ t⁴ of the transmitter.

The spindle 80 is rotated step by step by means of a ratchet-wheel 82, engaged by a spring-pawl 83, carried by a pivoted lever 84, which carries an armature 85 in position to be attracted by the poles of a magnet TM. The arrangement of the parts is such that the pawl 83 acts to rotate the ratchet-wheel and spindle 80 on the return movement of the armature under tension of a spring 86 when the magnet is deënergized. Overthrow of the ratchet-wheel is prevented and the return movement of the armature-lever limited by a pin or stop 88, carried by said lever in position to engage the ratchet-wheel, as shown. and the ratchet-wheel is held against reverse rotation on the forward movement of the armature-lever by a retaining-spring 87. The ratchet-wheel 82 is formed with sixty teeth, that being the number of contacts in the series T⁴ of the time-commutator.

The sleeves q' and q² are rotated through a ratchet-wheel 89 on the sleeve q² as follows: The spindle 80 carries a shouldered or cam disk 90 in position to engage a pin on a pivoted arm 91, which carries a spring-pressed pawl 92, engaging a ratchet-wheel 89 on the sleeve q². As the spindle rotates the shoulder on the disk 90 raises the arm 91 against the tension of a spring 93, by which as the shoulder passes the pin on the arm 91 the arm is moved toward the spindle 80. The pawl 92 is thus at each rotation of the spindle 80 caused to advance the ratchet-wheel 89 the distance of one tooth, and the trailers Q' and Q² will thus be rotated one step for each rotation of the spindle 80, and the ratchet-wheel 89 being formed with twelve teeth will make a complete revolution for each twelve rotations of the spindle. A spring-catch 94 engaging the teeth of the ratchet-wheel 89 prevents reverse movement of the ratchet-wheel as the pawl 92 is being moved back to engage the teeth of the ratchet-wheel for the next movement, and a pin 95, carried by the arm 91, engages the ratchet-wheel on the actuating movement of the pawl to prevent overthrow.

The receiving part of the apparatus in shown in Figs. 1, 2, 12, 13, 14, 15, and 16. It includes a type-wheel 100, provided, in the machine shown, with ten characters, "1, 2, 3, 4, 5, 6, 7, 8, 9, 0," arranged on its periphery. This type-wheel is carried by a sleeve 101, splined on a shaft 102, so as to permit the type-wheel to be moved longitudinally of the shaft for the letter-spacing, while causing it to be moved by the rotary movement of the shaft for the positioning of the characters for printing. The shaft 102 is given a step-by-step movement of rotation by means of a double or anchor pawl 103, acting on a star-wheel 104 on the shaft, this anchor-pawl being actuated by means of magnets FM and FM', located in position to attract from opposite sides an armature 105, carried by or forming part of the pivoted stem of the pawl 103. The circuit is controlled for the purpose of energizing and deënergizing the magnets FM and FM' alternately, so as to cause the armature to be alternately attracted in opposite directions to secure the oscillation of the pawl 103 by the following construction: The circuit to each of the magnets FM and FM' is through a pivoted insulated contact maker and breaker 106, arranged to make contact with contacts f and f', formed by adjustable contact-screws carried by insulated plates 108, provided with binding-screws 109, through which contacts f, f' the contact-maker closes circuit to the magnet FM and FM', respectively. This contact-maker is provided with a forked end, between the prongs of which extends a pin 110 from the pawl 103, the prongs of the fork being such distance apart as to be engaged, respectively, by the pin just before the pawl reaches the end of its movement in either direction. By this construction when the pawl is in its normal position (shown in Fig. 13 and also in the diagrammatic view, Fig. 21) the contact-maker 106 will be in position to make contact, through the contact f, to complete the circuit to the magnet FM, so that when the current is directed to the motor mechanism in the operation of the apparatus, as hereinafter described, the magnet FM will be energized and will attract the armature 105 to cause the movement of the pawl to the left from the position shown in said figures. During the greater portion of this movement of the pawl the pin 110 will move between the prongs of the forked end of the contact-maker 106 without causing any movement of the contact-maker; but just before the pawl reaches the end of its movement in this direction the pin will engage the prong of the fork on the left in these figures and then in its remaining removement will move the contact-maker to break contact with contact $f$ and make contact with contact $f'$, thus causing the magnet FM to be deënergized and the magnet FM' to be energized, whereupon the armature 105 will be attracted by the magnet FM' and the pawl caused to move to the right back to its normal position, as shown in Figs. 13 and 21. In this movement of the pawl also the contact-maker 106 will be moved only just before the pawl reaches the end of its movement to the right to break circuit to magnet FM' and again complete the circuit to magnet FM, whereupon the foregoing operation will be repeated. The star-wheel 104 is formed with ten teeth, so that each complete reciprocation of the pawl from its normal position and back again will cause the shaft 102 to be rotated to move the type-wheel the space of one character. This step-by-step movement of the type-wheel under the action of the motor mechanism thus described will continue until the circuit to such motor mechanism is broken, as hereinafter described.

The pawl 103 is preferably under spring-tension, as by spring 111, for the purpose of insuring the pawl always coming to rest in its extreme right-hand position, and thereby causing the type-wheel to be properly positioned and contact to be closed at $f$ and to remain so until circuit is again completed to the motor mechanism.

The shaft 102 carries also a trailer 112, moving over the face of a sunflower 113, having ten segments corresponding, respectively, to the ten characters on the type-wheel 100, to which segments the current is directed by the action of the transmitter according to the character to be printed. In the action of the apparatus, as the shaft 102 rotates step by step under the action of the motor mechanism above described, the trailer 112 will move over the segments of the sunflower 113 until it makes contact with the segment corresponding to the character to be printed and to which the current has been directed, whereupon the circuit will be completed through the trailer to a magnet SM. The armature 114 of this magnet is carried by a pivoted lever 115, held in its normal retracted position by a spring 116, and which is in electrical connection with the contact-maker 106 and which when in its normal retracted position makes contact with a contact $m$ to complete the circuit to the motor-magnets FM and FM'. When the magnet SM is energized, as above described, therefore the circuit to the motor-magnets will be broken and the rotation of the shaft 102 and type-wheel 100 consequently arrested, thus securing the positioning of the type-wheel in accordance with the impulse sent to the receiver.

The paper or other ribbon which is to receive the impression from the type-wheel is placed beneath the type-wheel on a supporting-plate 117, and the impression of the type after the positioning of the type-wheel is secured by causing the paper to be moved into contact with the type by means of an impression bar or platen 118, carried by one arm of a bell-crank lever 119, the other arm of which carries an armature 120 in position to be attracted by a magnet PM and held normally retracted by a spring 121 against an adjustable stop 122. The impression bar or platen 118 is preferably cushioned, as by being formed of a trough-like bar, as shown in Fig. 14, carrying a cushion of suitable yielding material. The armature-lever 115 carries an arm 123, which carries an insulated contact-spring 124 in position to make contact with a contact $n$ when the armature-lever 115 is moved by the energizing of the magnet SM to complete circuit to the printing-magnet PM and cause the printing of the characters brought into position by the positioning movement of the type-wheel.

The movement of the armature-lever 115 also actuates a contact maker and breaker 125, pivoted on an insulated plate 126 and making contact with a contact $p$, formed, preferably, by an adjustable screw to complete a circuit to the check-carriage-feed magnet CM of the transmitter. This contact maker and breaker is similar to the contact-makers 70 and 106 and like them makes and breaks contact only just before the end of the movement of the armature-lever, being provided with a forked end, between the prongs of which extends a pin 128, carried by the arm 123. In the normal retracted position of the armature-lever the contact maker and breaker is moved away from the contact $p$. The movement of the armature-lever, due to the energizing of the magnet SM, throws the contact-maker just before the end of the movement of the armature-lever to make contact with the contact $p$ to complete the circuit to the carriage-feed magnet. Then on the return movement of the armature-lever and just before the end of such return movement the contact-maker will be moved to break contact again, its movement in this direction being limited by a stop 129. For the purpose of holding the contact maker and breaker in its positions for making and breaking contact, respectively, and for insuring the full movement of such contact-maker a spring-mounted presser-roll 130 is provided to bear against the extended knife-edge end of the contact-maker.

The type-wheel 100 is fed longitudinally on the shaft 102 by means of a feeding-bar 135, mounted to move longitudinally parallel with the shaft 102 and carrying a pin 136, extending into a circumferential groove 137, formed by two collars on the sleeve 101, carrying the type-wheel. The longitudinal movement of the feed-bar 135 thus causes the type-wheel to be moved longitudinally on its shaft, while permitting it to be freely rotated in any position. The feed-bar is given a step-by-step movement by means of a pinion 138 engaging in a rack 139 on the feed-bar. This pinion is carried by a spindle 140, which also carries a ratchet-wheel 141 in position to be engaged by spring-pressed pawl 142, carried by the armature-lever 115, so that on the armature being attracted by the magnet SM the pawl 142 will cause a partial rotation of the spindle 140 and pinion 138 to cause the type-wheel to be advanced for one letter-space. On the return movement of the armature-lever the pawl will be retracted to engage with the next succeeding tooth of the ratchet-wheel, the ratchet-wheel being held against return movement by means of spring-catch 143. An offset or lug 144 on the armature-lever 115 engages with the teeth of the ratchet-wheel to prevent overthrow.

The ratchet-wheel 141 is formed with the proper number of teeth according to the number of characters or spaces for which the printing mechanism is designed, so that for each line printed, or in the construction shown for each record made, since each record takes the space of one printed line, the spindle 140 will be caused to make a complete rotation. The pinion 138 is formed with a flattened side, which coming opposite the rack 137 when the feed-bar is at the end of its advance movement and the spindle 140 has made a complete rotation permits the bar to be returned to carry the type-wheel back to its normal position. This return movement of the rack-bar is accomplished by means of a cord 145, which was unwound from a drum 146 under spring tension, as by a spring 147, as the feed-bar was advanced for the letter-spacing.

Ink is preferably supplied to the type-wheel by an inking-wheel 148, carried by an arm 149, pivoted to a bracket on the feed-bar, so that the inking-wheel will move with the feed-bar and type-wheel and rest on the periphery of the type-wheel, so as to ink the type as the type-wheel is rotated.

The paper or other ribbon is advanced for line-spacing by means of a feeding-wheel 150, engaging the lower surface of the paper through an opening in the plate 117 and co-acting with a spring-pressed roll 151, engaging the paper from above. The feeding-wheel 150 is given a step-by-step movement by means of a spring-pressed pawl 152, carried by a pivoted bar 153 and engaging a ratchet-wheel 154 on the shaft of said feeding-wheel. The arm 153 is raised against the tension of a spring 155 by means of a spiral cam 156, carried by the spindle 140, said cam engaging a pin 157 on said arm. When the cam 156, having raised the arm 153, passes by the further rotation of the spindle 140 from beneath the pin 157, the arm 153 moves under the action of the spring 155 and the pawl 152, acting on the ratchet-wheel 154, causes a partial rotation of the feeding-wheel 150 and consequent feeding forward of the paper for the line-spacing. The paper will thus be fed forward once for each rotation of the spindle 140 —that is, after the printing of each line. A spring-catch 158, engaging the teeth of the ratchet-wheel 154, prevents its backward movement during the return movement of the pawl, and overthrow of the ratchet-wheel is prevented by means of a finger 159, carried by the arm 153 and engaging the teeth of the ratchet-wheel on the downward movement of the arm.

The operation of the apparatus will now be described, reference being had to the diagrammatic view, Fig. 21, showing the various electrical connections between the parts of the apparatus heretofore described and showing diagrammatically so much of the apparatus as is necessary to show the electrical connections and to make the operation clear. Such a description can best be given by following in order as near as may be and so far as is necessary for an understanding of the invention the successive operations of the various parts of the apparatus as set in motion by the dropping of a check into the receiving-slot of the transmitter. Suppose then that one of the operating-checks be dropped into the receiving-slot of the transmitter. As it descends to the check-carriage 25 its lower edge will strike the ends of the arms 18 of the contact-fingers 10 and throw said arms backward, thereby raising the contact-fingers 10 away from the contacts $a'$ $a^2$ $a^3$ $a^4$ $a^5$ $a^6$ $a^7$ $a^8$ $a^9$ $a^0$ $a^x$. At the same time, or immediately afterward, the arm 54, carrying the stop 52, will be thrown backward by the check to release the bar 48 of the main contact K and allow the contact-spring 47 to make contact with the plate 46, thereby connecting the transmitting and receiving portions of the apparatus in circuit and completing the circuit from battery Z to the magnets FM FM', as follows: starting from the battery Z by wire 200 to contact maker and breaker 70, contact $l$, wire 201, contact-plate 51, contact-spring 49, bar 48, contact-spring 47, contact-plate 46, wire 202, motor-magnet FM, wire 203, contact $f$, contact-maker 106, wire 204, armature-lever 115, contact $m$, wire 205, back to battery Z. The anchor-pawl 103 is thereby made to oscillate to cause the step-by-step rotation of the shaft 102 and type-wheel 100. Meanwhile, the check having become seated on the carriage 25, the lowermost of the openings $o$ will have come opposite the end of the arm 18 of the finger 10 to which it corresponds in horizontal position, thereby allowing that finger 10 to drop back to make contact with its corresponding contact 12. Suppose the plate to have its openings arranged so as to cause the printing of a number which requires the greatest number of figures that the apparatus is constructed to print—that is, in the construction shown, ten—and suppose that the first figure of the number to be recorded be. say, "5." The finger which is permitted to drop into position to make contact will therefore be the finger making contact with contact $a^5$. The series of contacts $a'\ a^2\ a^3\ a^4\ a^5\ a^6\ a^7\ a^8\ a^9\ a^0$ are electrically connected, as by wires $w'\ w^2\ w^3\ w^4\ w^5\ w^6\ w^7\ w^8\ w^9\ w^0$, with the segments 1 2 3 4 5 6 7 8 9 0, respectively, of the sunflower 113. When, therefore, by the rotation of the shaft 102 the trailer 112 is brought to make contact with the segment 5 of the sunflower 113, circuit will be completed through the space-magnet SM, as follows: starting from the contact $a^5$, through wire $w^5$, segment 5 of the sunflower 113, trailer 112, wire 210, magnet SM, wire 205, battery Z, wire 200, contact-maker 70, contact $l$, wire 201, contact-bar 51, contact-spring 49, bar 48, contact-spring 47, contact-plate 46, wire 202, wire 211, contact-finger 10, back to contact $a^5$. On the magnet SM being thus energized, the armature-lever 115 will be moved away from the contact $m$, thereby breaking the circuit to the motor-magnets FM FM', and thus arresting the positioning movement of the type-wheel when it has been moved into position for the printing of the figure "5"—that is, the figure corresponding to the first of the openings $o$ in the check-plate. As the armature-lever 115 approaches the end of its movement contact is made between spring 124 and contact $n$, completing a local circuit through battery LZ to the printing-magnet PM, as follows: starting from battery LZ, through wire 220, magnet PM, wire 221, contact-spring 124, contact $n$, wire 222, armature 160, contact $e$, wire 223, back to battery LZ. The armature-lever 115 just before it reaches the end of its movement also causes the movement of the contact-maker 125, as before described, to make contact with contact $p$, thereby completing a circuit from battery Z' through the carriage-feed magnet CM, as follows: starting from battery Z', wire 230, to contact-maker 125, contact $p$, wire 231, magnet CM, and back to battery Z' by wire 232. The movement of the armature-lever 31 on the energizing of the magnet CM causes the check-carriage to be fed downward one step in the manner hereinbefore described, thus bringing the next opening in the check-plate opposite the end of the arm of the finger to which said opening corresponds in horizontal position, thus causing that finger to make contact with its corresponding contact of the series $a'$ to $a^0$ or $a^5$. The motor-magnets FM FM' will, however, not be energized by the making of this contact, since the circuit to said magnets is broken between the armature-lever 115 and the contact $m$. As the armature-lever 31 nears the end of its movement it actuates the contact maker and breaker 70, as before described, to break contact with contact $l$, thereby opening the circuit to the space-magnet SM of the receiver and making a second break in the circuit to the motor-magnets. By this deënergization of the magnet SM the armature 114 is released and the lever 115 allowed to return under the action of the spring 116. This return movement of the armature-lever 115 opens the local printing-circuit at contact $n$ and closes contact in the circuit of the motor-magnets FM FM' at contact $m$. The closing of contact at $m$ does not, however, cause the energizing of the magnets FM FM', since the circuit to these magnets has been broken by the movement of the contact maker and breaker 70, as above noted. As the armature-lever 115 nears the end of its return movement it moves the contact maker and breaker 125 away from contact $p$, thus opening the circuit to the carriage-feed magnet CM. The deënergizing of the magnet CM allows the armature-lever 31 to return to its normal position under the action of the spring 33, and thereby to move the contact maker and breaker 70 to make contact again at $l$. The circuit to the motor-magnets FM FM' is thereby reëstablished, contact having meanwhile been made by one of the fingers 10, as before stated.

The operation of the apparatus, as above set out, will be repeated if contact has been made through one of the contacts $a'$ to $a^0$ other than the contact $a^5$. If contact has again been made through the contact $a^5$, the space-magnet SM will be immediately energized, since the trailer 112 will be in contact with the segment 5 of the sunflower 113, and there will be no movement of the type-wheel until some succeeding and other contact is made by one of the fingers 10. These successive operations will be repeated as the openings in the check-plate are successively brought into position opposite the ends of the arms of the contact-fingers 10 until the series of figures corresponding to the openings in the plate and constituting the number to be recorded have been printed by the receiving mechanism, the check-carriage being advanced downward step by step by the successive energizations of the magnet CM and the type-wheel being correspondingly advanced step by step for the letter-spacing by the successive energizations of the space-magnet SM and the electrical connections being reëstablished, as shown in Fig. 21, at the end of each series of operations which causes the recording of a number or the movement of the type-wheel for a space.

If the number to be recorded is made up of a less number of figures than the machine is capable of recording, the first opening or openings $o$ in the check, according to the number of figures in the number, will be in horizontal position to come opposite the arm of the finger 10, making contact with the contact $a^s$. By such contact circuit is completed directly to the space-magnet SM, as follows: starting from the battery Z, through wire 200, contact maker and breaker 70, contact $l$, wire 201, contact-bar 51, contact-spring 49, bar 48, contact-spring 47, contact-plate 46, wire 202, wire 211, finger 10, contact $a^s$, wire $w^s$, magnet M', magnet SM, wire 205, back to battery Z. The magnet SM is thereby energized to cause the movement of the armature-lever 115, and thereby to effect the spacing movement of the type-wheel and to move the contact-maker 125 to make contact at $p$ to complete the circuit to the carriage-feed magnet CM, as before described. The movement of the armature-lever 115 also closes contact between the spring 124 and contact $n$ in the local circuit to the printing-magnet PM, as before; but the energizing of this magnet is prevented by means of the magnet M', interposed in the line $w^s$, which acts to attract the armature 160, and thereby break contact between the armature 160 and the contact $e$ in the printing-circuit.

During the step-by-step downward movement of the check-carriage for bringing the successive openings $o$ in the check opposite the ends of the arms 18 of the contact-fingers 10 the contact-spring 47 will have moved downward in contact with the contact-plate 46, and when the last or uppermost opening in the check-plate has been brought into position opposite the ends of the arms 18 the contact-spring 47 will have been moved down nearly to the lower end of the contact-plate 46. Then by the next downward movement of the carriage the spring 47 will be moved below the lower end of the contact-plate 46 and will make contact with the contact $s'$. By the same movement of the carriage and after the check has moved downward, so that that finger the arm of which extended into the last of the openings $o$ has been thrown up to break contact, the arm 63 is thrown backward by the engaging of the upper edge of the slot 65 in the plate 20 with the offset 64 on said arm to rock the shaft 62 to move the stop 60 into position to engage the pins 61 on the arms of the contact-fingers 10, so as to hold the contact-fingers out of contact after the upper edge of the check has descended below the arms 18 of the contact-fingers. By this movement of the arm 63 contact is also made between the contact-spring 67 and contact 68 to make circuit to the motor-magnets FM FM', as follows: starting from the battery Z by wire 200 to contact maker and breaker 70, contact $l$, wire 201, wire 240, contact 68, contact-spring 67, wire 211, wire 202, magnet FM, wire 203, contact $f$, contact maker and breaker 106, wire 204, armature-lever 115, contact $m$, wire 205 to battery Z. This circuit takes the place of the circuit to the motor-magnets established at the beginning of the operation of the apparatus through the contact-plate 46 and contact-spring 47. The contact-fingers 10 being inoperative during the remainder of the downward movement of the carriage, the successive impulses in the further operation for the recording of the time are made through the contact-spring 47 making contact successively with the contacts $s'$ $t'$ $t^2$ $s^2$ $t^3$ $t^4$ $s^3$ the contacts $t'$, $t^2$, $t^3$, and $t^4$ being electrically connected, respectively, with the series of contacts T' T² T³ T⁴ of the time-commutator and contact of the spring 47 with the contacts $s'$, $s^2$, and $s^3$ completing circuit to cause a space to be recorded in the same manner as by the contact of one of the fingers 10 with the contact $a^s$, as before described.

The series of contacts T⁴ of the time-commutator through which contact is made for completing the circuit for causing the record of the last figure of minutes consists of sixty contacts connected in successive series of ten with the wires $w^0$ $w'$ $w^2$ $w^3$ $w^4$ $w^5$ $w^6$ $w^7$ $w^8$ $w^9$, respectively, leading to the sunflower 113. The shaft 80 being given a step-by-step rotation by means of the ratchet-wheel 82 and pawl 83 actuated by the magnet TM, as hereinbefore described, and the ratchet-wheel being formed with sixty teeth, the trailer Q⁴ will be given a step-by-step rotation to make contact successively with each of the sixty contacts of the series T⁴. The magnet TM is energized for causing this step-by-step rotation of the shaft 80 at intervals of a minute by means of a suitable contact maker and breaker controlled by clockwork—such, for example, as the rotary contact maker and breaker diagrammatically shown in Fig. 21 on a minute-spindle 180 of the clock 181, and making contact at each rotation with a contact-spring 182 to complete circuit from the battery Z' to the magnet TM, as follows: starting from the battery by wire 250 to contact-spring 182, spindle 180, wire 251, magnet TM, wire 252, back to battery Z'.

The series of contacts T³, through which circuit is completed for the recording of the first figure of minutes, includes six contact-plates connected, respectively, with the wires $w^0$ $w'$ $w^2$ $w^3$ $w^4$ $w^5$. These contact-plates form a practically continuous circular contact, being separated only by narrow spaces, so that the trailer Q³ will remain in contact with each of these contact-plates successively, while the trailer Q⁴ is making contact with ten of the contacts of the series T⁴.

The series of contacts T², through which circuit is completed for the recording of the second figure of hours, includes twelve contacts connected with the wires $w'$ to $w^9$ in the following order: $w^2$ $w'$ $w^2$ $w^3$ $w^4$ $w^5$ $w^6$ $w^7$ $w^8$ $w^9$ $w^0$ $w'$. The trailer Q² making contact with this series of contacts is given a step-by-step movement of rotation in the manner hereinbefore explained, moving one step for each complete rotation of the trailers Q³ and Q⁴ and moving at each step one-twelfth of a revolution. It is therefore caused to jump from one contact to the next succeeding contact once for each complete rotation of the trailers $Q^3$ and $Q^4$—that is, once every hour.

The series of contacts T', through which contact is completed for the printing of the first figure of hours, includes three contacts connected with the wire $w'$, corresponding in position with the three successive contacts of the series $T^2$, connected with the wires $w^0$ $w'$ $w^2$, respectively, so that when the trailer $Q^2$ makes contact with the contact of the series $T^2$, connected with the wire $w^0$, and with the next succeeding two contacts the trailer $Q'$ will engage contacts of the series T' connected with the wire $w'$. During the remainder of the rotation of the trailer $Q'$ it engages contacts connected with the wire $w^s$, so as to cause the recording of a space when the trailer $Q^2$ makes contact for the recording of the hours "1" to "9."

To avoid confusion, the electrical connections between the contacts of the time-commutator and the wires $w'$ to $w^0$ and $w^s$ have been shown only in part, but sufficiently to make the remaining connections and the operation of the apparatus clear. All the contacts connected with the wire $w^0$ are indicated by the figure 0, the contacts connected with the wire $w'$ by the figure 1, &c., and the contacts connected with the wire $w^s$ by the letter $s$. Instead of having the series T' formed of twelve contacts, none of which are connected with the wire $w^s$, it might, of course, be formed of but two contacts, one extended contact connected with the wire $w^s$ being provided in place of the nine contacts, as shown, and one extended contact connected with the wire $w'$ in place of the three contacts, as shown. The order of connection of the contacts of the series $T^2$ $T^3$ $T^4$ with the wires $w'$ to $w^0$ has been given, starting with the contact with which the respective trailers contact for causing the time-record at twelve o'clock, thus "12.00."

The operation of the time-commutator will be understood from the description already given and the following brief statement: Starting at twelve o'clock, the trailers $Q'$ $Q^2$ $Q^3$ $Q^4$ will be in contact with contacts connected with the wires $w'$ $w^2$ $w^0$ $w^0$, respectively, and if a record is made at this time the time will be recorded thus, "12.00." The magnet TM, being energized at intervals of a minute, the trailer $Q^4$ will make contact with the successive contacts of the series $T^4$ at minute intervals. The trailer $Q^3$, moving with the trailer $Q^4$, moves over the contact of the series $T^3$, connected with the wire $w^0$, while the trailer $Q^4$ makes contact with the nine contacts connected with the wires $w'$ to $w^9$. The proper connections will thus be successively made for recording the time from one minute after to nine minutes after twelve, thus: "12.01," "12.02," &c., to "12.09." As the trailer $Q^4$ moves from the contact of the series $T^4$, connected with the wire $w^9$, to the next contact, which is connected with the wire $w^0$, trailer $Q^3$ will move from the contact of the series $T^3$, connected with the wire $w^0$, to the contact connected with wire $w'$, the time-commutator thus making connection for making the time-record for ten minutes after twelve, thus "12.10." The step-by-step rotation of the spindle 80 continuing the trailer $Q^3$ moves to a new contact at every tenth contact made by the trailer $Q^4$—that is, once in every ten minutes—as is required for changing the first figure of minutes. On the last step in the movement of the spindle 80 and the trailers $Q^3$ and $Q^4$, which completes a rotation of the spindle and trailers, these trailers $Q^3$ and $Q^4$ will again make contact, as for twelve o'clock, and the trailers $Q'$ and $Q^2$ will move a step, as hereinbefore described—the trailer $Q'$ to a contact connected to the wire $w^s$ and the trailer $Q^2$ to a contact connected to the wire $w'$. The connections will thus be completed for the recording of the time at one o'clock, thus "1.00." The trailers $Q'$ and $Q^2$ will then remain stationary, while the trailers $Q^3$ and $Q^4$ make another complete rotation, as before, at the end of which the trailers $Q'$ and $Q^2$ will again move for making connections for recording the time at two o'clock. These movements will continue so long as the energizing and deenergizing of the magnet TM is continued, the trailers $Q^3$ and $Q^4$ moving in time with the minute-hand of a watch and the trailers $Q'$ and $Q^2$ in time with the hour-hand. Connections will thus be made for recording whenever a record is made the exact time to minutes.

Returning now to the operation of the apparatus, the carriage having been advanced downward to carry the spring-contact 47 below the contact-plate 46 and into contact with the contact $s'$ circuit will be completed to the motor-magnets FM FM' through contact-spring 67 and contact-maker 70, as before explained. At the same instant, however, contact of spring 47 with contact $s'$ will complete circuit to the space-magnet SM as follows: Starting from battery Z by wire 200, contact maker and breaker 70, contact $l$, wire 201, contact-bar 51, contact-spring 49, bar 48, contact-spring 47, contact $s'$, wire $w^s$ through magnet M' to magnet SM, and by wire 205 back to battery Z. The circuit to the motor-magnets of the receiver will therefore be immediately broken by the movement of the armature-lever 115, and by the movement of said armature-lever the typewheel will be moved one letter-space for the space between the number which has been recorded and the time which is to be recorded, the raising of the impression-bar being also prevented by the energizing of the magnet M', as before explained. The movement of the armature-lever 115 makes connection for completing the circuit to the carriage-feed magnet CM, and the making and breaking of contacts follows, as before pointed out, and the parts are again returned to normal position and circuit again completed to the motor-magnets FM FM'. The contact-spring 47 will meanwhile have been moved by the further downward movement of the carriage away from contact $s'$ and into contact with $t'$. Suppose the time to be such that the hour will be represented by one of the figures "1" to "9." Then the trailer $Q'$ will be in contact with a contact connected with the wire $w^s$ and circuit will be immediately completed to the space-magnet SM as last traced, except that from contact-spring 47 the circuit will be to contact $t'$, and then by wire 261, trailer $Q'$, one of the contacts marked $s$ of the series $T'$, and wire $v^s$, to wire $w^s$, and then, as before, to magnet SM, and by wire 205 back to battery Z. The type-wheel will therefore be again moved for a letter-space, and the parts of the apparatus returned to their normal position without the printing of any figure. If, however, one of the hours "10, 11, or 12" is to be recorded, contact of the spring 47 with the contact $t'$ will connect the segment 1 of the sunflower 113 with the battery Z as follows: Starting from the battery by wire 200, contact-maker 70, contact $l$, wire 201, contact-bar 51, contact-spring 49, bar 48, contact-spring 47, contact $t'$, wire 261, trailer $Q'$, one of the contacts $l$ of the series T', wire $v'$, wire $w'$, to the segment 1 of the sunflower. Unless the last figure recorded was "1," the type-wheel will then be rotated step by step, circuit being completed to the motor-magnets FM FM', as before pointed out, and this rotation will continue until the trailer 112 makes contact with the segment 1 of the sunflower, whereby circuit to the magnet SM will be completed, and by the movement of the armature-lever 115 the circuit to the motor-magnets broken, the type-wheel fed a letter-space, and contacts made to complete circuits for causing the printing-bar to be raised for the recording of the figure "1," and the check-carriage to be fed downward one space to bring the contact-spring 47 into contact with the next contact $t^2$, and the parts to be again returned to normal position. By the closing of contact between spring 47 and contact $t^3$ current will be sent to the segment of the sunflower corresponding to the contact of the series $T^2$ of the time-commutator engaged by the trailer $Q^2$, and the movements for recording the corresponding figure will follow. On the next step in the downward movement of the carriage the spring-contact 47 will make contact with contact $s^2$, connected with the wire $w^s$ for the recording of the space between the figures for hours and the figures for minutes, and the succeeding two downward movements of the carriage will bring the spring 47 into contact successively with the contacts $t^3$ and $t^4$ for the sending of impulses through the trailers $Q^3$ and $Q^4$ and series of contacts $T^3$ and $T^4$, respectively, of the time-commutator for the printing of the numbers for recording the minutes, as will be readily understood from the description already given. The last downward movement of the carriage during the operation of printing the last figure for minutes causes the contact-spring 47 to make contact with contact $s^3$, again completing circuit to the space-magnet SM. The movement of the spindle 140, which follows the movement of the armature-lever 115, brings the flat side of the pinion 138 opposite the rack 139, thereby allowing the feed-bar 135 to be returned by the cord 145 and drum 146 to carry the type-wheel back to normal position, as shown in the drawings. This same movement of the spindle 140 also carries the cam 156 beyond the pin 157, thus allowing the pivoted bar 153 to be moved downward under the tension of the spring 155 to advance the paper-feeding wheel 150 one step under the action of the pawl 152 on the ratchet-wheel 154. The paper is thus advanced for the next record. The energizing of the carriage feed-magnet CM, which follows this movement of the armature-lever 115, causes the pinion 27 to be rotated one step as before, and this movement of the pinion brings its flat side opposite the rack 26, thereby allowing the check-carriage to be returned under the action of the cord 37 and drum 38 to its normal raised position shown in the drawings; but before the flat side of the pinion comes opposite the rack, and thus releases the carriage, it has acted to give the carriage a further downward movement to bring the pin 57 on the bar 48 below the end of the guide 59, thereby releasing the bar 48 and allowing it to move under the tension of the spring 49 to carry the contact-spring 47 away from the contact $s^3$. Then on the upward movement of the carriage the pin 57 engages the outer side of the guide 59 and the contact-spring 47 is held away from the contact-plate 46, and just before the pin 57 reaches the upper end of the guide 59 the pin 53 on the end of the bar 48 engages the stop 52, by which the bar 48 is held against the tension of the spring 49, which now tends to move the bar and contact-spring 47 toward the contact-plate 46 until another check is dropped into the receiving-slot, all as hereinbefore explained. The upward movement of the carriage also releases the arm 63 and allows it to be moved forward to its normal position under the action of the spring 66 to break contact between contact-spring 67 and contact 68 and to move the stop 60 to release the contact-fingers 10. All the parts of the apparatus are thus returned to their normal position and the apparatus is ready for the making of another record on another check being dropped into the receiving-slot of the transmitter.

The machine is shown as constructed to print a number of ten figures or less or two or more numbers occupying the space of ten figures or less and then to record the time at which the record is made. It is evident, however, that the construction shown may be readily modified, so as to make an apparatus having a capacity for printing a greater or less number of figures than ten. It is evident also that a type-wheel having other characters than numbers may be employed or having a greater or less number of characters than shown, as may be desired or found necessary for the purpose for which the apparatus is to be used.

While I have shown for the purpose of illustrating the preferred manner of carrying out the invention an apparatus in which the transmitting and receiving portions are located together to form practically a single instrument, and while such an arrangement is desirable for many of the purposes to which the invention is applicable, it will be understood that the receiving and transmitting portions of the apparatus may be located at different points at greater or less distance apart, as may be desired; also, that more than one receiving apparatus may be connected to and operated by impulses sent from a single transmitter, such receivers being located at different points. So, also, a single receiver may be arranged to receive and record impulses from several transmitters located at different points.

It is evident that the invention may be put to a great variety of uses. Some of such uses which have already occurred to me will now be briefly noticed.

Apparatus embodying the invention will be found especially well adapted for use as an employee's time-recorder. When used for this purpose, an operating-check will be provided for each employee corresponding to the number by which he is known, and on arriving at and leaving the shop or other place where working the workman will be required to drop his check into the receiving-slot of the machine. An accurate record may thus be kept of the time of arrival and departure of all employees both at the beginning and end of the day's work and at the noon hour. Apparatus embodying the invention will be found of especial value for this purpose where outside work or construction work is being done, as the apparatus may be constructed to be conveniently portable.

In addition to making a record of the number of the employee and the time the apparatus embodying my invention also permits, as will be readily understood, of the recording of other information—such, for example, where the working force is composed of a number of divisions or gangs of the division to which the particular workman belongs, the checks being properly formed for this purpose.

The invention is also well adapted to be used for cash registers or recorders, enabling not only the amount, but also the time to be recorded, or, if desired, the mechanism and connections for recording the time may be omitted. When used for this purpose, checks will be provided for, causing the recording of the various amounts for which purchases may be made, and for each purchase the check corresponding to the amount of the purchase will be dropped into the receiving-slot by the salesman. A great advantage of my invention used for this purpose is that the record of the purchases may be made not only at the place where the purchase is made, but also or only at any distant point, as may be desired, according to the necessities and character of the establishment where the apparatus is used, thus enabling a complete and accurate contemporaneous record of purchases to be made at such distant point.

As a general time-stamp the invention will be found of great value when it is desired to record not only the time, but other information which the apparatus is adapted to record.

The invention will also be found to be well adapted for use as a watchman's recorder. When used for this purpose, both the receiving and transmitting portion of the apparatus will be located at a central station which is connected electrically with the various points or stations which the watchman is required to visit in his rounds. Means are provided whereby the impulses sent by the watchman from such points cause the release of successive checks, which dropping into the receiving-slot of the transmitter start the apparatus and cause the proper records to be made. Fig. 23 shows diagrammatically an arrangement of circuits and devices for causing the release of the checks and their delivery to the receiving-slot by the act of the watchman at the various signal-stations in his round. Referring to said figure, D represents the recording apparatus, including the parts which we have termed "transmitting" and "receiving" portions. $g\ g'\ g^2\ g^3$ are a series of tubes or conduits leading to a single tube G, which leads to the receiving-slot of the transmitter. Retaining-fingers carried by armature-levers $h\ h'\ h^2\ h^3$ act to hold check-plates in the upper portions of the tubes $g\ g'\ g^2\ g^3$ and are moved to release the check-plates by magnets $i\ i'\ i^2\ i^3$, attracting armatures on said levers. At the various stations $J\ J'\ J^2\ J^3$, that the watchman is required to visit in his rounds, are located suitable contact-makers $j\ j'\ j^2\ j^3$ to be operated by a key or by a simple push-button, as indicated in the drawings, or in any other suitable manner. These contacts complete circuits through the magnets $i\ i'\ i^2\ i^3$, as indicated. The operation is evident. The watchman on visiting the station J operates the contact $j$, thus closing circuit to magnet 13

$i$, and thereby causing the check in the tube $g$ to be released by the movement of the armature-lever $h$. This check dropping through the tube $g$ to the tube G and to the receiving-slot of the transmitter causes the recording of the number or numbers designating the station J and to which it corresponds, together with the time. In like manner the checks in the tubes $g'$, $g^2$, and $g^3$ will be successively released by the completing of the circuits by the actuation of the contact-makers at the stations $J'$, $J^2$, and $J^3$ as they are successively visited by the watchman in his rounds. Any number of stations to be visited by the watchman may be thus connected with the central station, and an accurate record thus made of the times at which and the order in which the watchman visits such stations.

The invention will doubtless be found applicable to other uses than those thus briefly noted.

It will be understood that apparatus for carrying out the invention may vary largely from that shown for the purpose of illustrating the preferred construction embodying the invention and to which the foregoing description has been mainly confined. The claims, therefore, are not to be limited to the exact construction shown, but are to be considered as including such other constructions and arrangements as may be found suitable for carrying out the invention. It is to be noted also that various parts and features of the invention may be used independently of other parts and features and in combination with coöperating parts which do not embody features of the invention. For example, transmitting mechanism embodying the invention so far as applicable to such mechanism may be used in connection with other forms of receiving mechanism than those included in the claims, and, similarly, receiving mechanism such as is covered by my claims may be used in connection with other types of transmitting mechanism than I have claimed.

What is claimed is—

1. The combination with a printing-telegraph receiver, of a transmitter for sending successive impulses to the receiver and controlled for the sending of such successive impulses by the movement of a member of the receiver, substantially as described.

2. The combination of a printing-telegraph receiver, a transmitter having a member moving step by step to send successive impulses to the receiver and an electromagnet controlling the step-by-step movement of said member, and a circuit to said magnet controlled by the movement of a member of the receiver, substantially as described.

3. The combination of a printing-telegraph receiver, a transmitter having a series of contact-fingers and means controlled by an electromagnet for moving step by step past said fingers a check having finger-operating devices arranged to cause the contact-fingers to make contact successively according to the impulses to be sent to the receiver, and a circuit to said magnet of the transmitter controlled by the movement of a member of the receiver, substantially as described.

4. The combination with a printing-telegraph receiver having a rotary type-wheel and means for positioning the type-wheel according to the impulses sent by the transmitter, of a transmitter for sending successive impulses to the receiver and controlled for the sending of such impulses by the movement of a member of the receiver, substantially as described.

5. The combination in a printing-telegraph system, of a transmitter having mechanism for sending to the receiver successive impulses corresponding to the characters to be recorded; and a receiver having a rotary type-wheel, motor mechanism for rotating the type-wheel, a magnet the movement of whose armature stops the rotation of the type-wheel, and means controlled according to the movement of the type-wheel whereby circuit is completed for the energizing of said magnet by said impulses when the type-wheel is positioned to record the characters corresponding to said impulses, substantially as described.

6. The combination with a printing-telegraph receiver having a rotary type-wheel, motor mechanism for rotating the type-wheel, and a magnet the movement of whose armature stops the rotation of the type-wheel, of a transmitter having mechanism for sending to the receiver successive impulses whereby said magnet of the receiver is energized to stop the rotation of the type-wheel when the type-wheel is positioned to record the characters corresponding to said impulses, said mechanism being controlled for the sending of successive impulses by said magnet of the receiver, substantially as described.

7. The combination with a printing-telegraph receiver having a rotary type-wheel, motor mechanism for rotating the type-wheel, and a magnet the movement of whose armature stops the rotation of the type-wheel, of a transmitter having mechanism for sending to the receiver successive impulses whereby said magnet of the receiver is energized to stop the rotation of the type-wheel when the type-wheel is positioned to record the characters corresponding to said impulses, and a magnet controlling said transmitting mechanism for the sending of the successive impulses to the receiver, said magnet being in a circuit controlled by the movement of the armature of said magnet of the receiver, substantially as described.

8. The combination with a printing-telegraph receiver having a rotary type-wheel, motor mechanism for rotating the type-wheel, and a magnet the movement of whose armature stops the rotation of the type-wheel, of a transmitter having mechanism for sending to the receiver successive impulses whereby said magnet of the receiver is energized to stop the rotation of the type-wheel when the type-wheel is positioned to record the characters corresponding to said impulses, and a magnet controlling the operation of said mechanism for the sending of the successive impulses, and means for controlling the circuits to said magnets each by the movement of the armature of the other of said magnets, substantially as described.

9. The combination with a printing-telegraph receiver having a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, and an electromagnet in electrical connection with said trailer and by the movement of whose armature the circuit to the motor-magnets is broken, of a transmitter for sending impulses to the segments of the sunflower according to the characters to be recorded and controlled for the sending of successive impulses by the movement of the armature of the last said magnet of the receiver, substantially as described.

10. The combination with a printing-telegraph receiver having a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, and an electromagnet in electrical connection with said trailer and by the movement of whose armature the circuit to the motor-magnets is broken, of a transmitter including mechanism for sending a succession of impulses to the segments of the sunflower according to the characters to be printed and a magnet controlling the operation of said mechanism for causing the sending of the successive impulses, and means for controlling the circuits to said magnet of the transmitter and the second said magnet of the receiver each by the movement of the armature of the other of said magnets, substantially as described.

11. The combination with a printing-telegraph receiver having a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, and an electromagnet in electrical connection with said trailer and by the movement of whose armature the circuit to the motor-magnets is broken, of a transmitter including mechanism for sending a succession of impulses to the segments of the sunflower according to the characters to be printed and a magnet controlling the operation of said mechanism for causing the sending of the successive impulses, a contact maker and breaker actuated at the end of the movement of the armature of said magnet of the transmitter and controlling the circuit to the second said magnet of the receiver, and a contact maker and breaker actuated at the end of the movement of the armature of the second said magnet of the receiver and controlling the circuit to said magnet of the transmitter, substantially as described.

12. The combination with a printing-telegraph receiver having a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, and an electromagnet in electrical connection with said trailer and by the movement of whose armature the circuit to the motor-magnets is broken, of a transmitter having a series of contact-fingers for sending impulses to the segments of the sunflower according to the characters to be recorded, a carriage for checks formed to actuate said fingers in succession according to the characters to be recorded, an electromagnet and mechanism controlled thereby for giving the carriage a step-by-step movement, said magnet being in a circuit through a contact maker and breaker controlled by the second said magnet of the receiver, substantially as described.

13. In a printing-telegraph system comprising a transmitter having mechanism for sending to the receiver impulses corresponding to the characters to be recorded, and a receiver having a rotary type-wheel and means for rotating the type-wheel, a magnet controlling the transmitting mechanism for the sending of the impulses to the receiver, a circuit to said magnet controlled by the movement of a member of the receiver, a magnet determining the rotation of the type-wheel of the receiver, and a circuit to said magnet controlled by the movement of a member of the transmitter, substantially as described.

14. In a printing-telegraph system comprising a transmitter having mechanism for sending to the receiver impulses corresponding to the characters to be recorded, and a receiver having a rotary type-wheel and means for rotating the type-wheel, a magnet controlling the transmitting mechanism for the sending of the impulses to the receiver, a magnet determining the rotation of the type-wheel of the receiver, and means for controlling the circuits to said magnets each by the movement of the armature of the other of said magnets, substantially as described.

15. In a printing-telegraph system comprising a transmitter having mechanism for sending to the receiver impulses corresponding to the characters to be recorded, and a receiver having a rotary type-wheel and mechanism giving the type-wheel a step-by-step rotation including a star-wheel and anchor-pawl and one or more magnets reciprocating the anchor-pawl, a magnet controlling the transmitting mechanism for the sending of the impulses to the receiver, a magnet controlling the circuit to the magnets of the motor mechanism of the receiver, and means for controlling the circuits to said magnets each by the movement of the armature of the other of said magnets, substantially as described.

16. In a printing-telegraph system comprising a transmitting mechanism and a receiving mechanism having a rotary type-wheel and means for positioning the type-wheel according to the impulses sent by the transmitting mechanism, a magnet controlling the operation of the transmitting mechanism, and means for controlling the circuit to said magnet by the movement of a member of the receiving mechanism, substantially as described.

17. The combination in a printing-telegraph system, of a transmitter having a member moving step by step for the sending of successive impulses to the receiver and an electromagnet controlling the step-by-step movement of said member, a receiver having a rotary type-wheel, mechanism for rotating said type-wheel, and an electromagnet by the movement of whose armature the rotation of the type-wheel is stopped, and circuits to said magnets controlled each by a contact maker and breaker actuated at the end of the movement of the armature of the other of said magnets, substantially as described.

18. The combination in a printing-telegraph system, of a transmitter having a member moving step by step for the sending of successive impulses to the receiver and an electromagnet controlling the step-by-step movement of said member, a receiver having a rotary type-wheel, mechanism for rotating said type-wheel, and a second magnet by the movement of whose armature the rotation of the type-wheel is stopped, a contact maker and breaker actuated to make and break circuit to the first said magnet at the end of the forward and return movement respectively of the armature of the second said magnet, and a contact maker and breaker actuated to break and make circuit to the second said magnet at the end of the forward and return movement respectively of the armature of the first said magnet, substantially as described.

19. The combination in a printing-telegraph system, of a transmitter having a member moving step by step for the sending of successive impulses to the receiver and an electromagnet controlling the step-by-step movement of said member, a receiver having a rotary type-wheel, mechanism for rotating said type-wheel, and an electromagnet by the movement of whose armature the rotation of the type-wheel is stopped, circuits to said magnets controlled each by a contact maker and breaker actuated at the end of the movement of the armature of the other of said magnets, and means whereby said circuits are broken by the return movement of said member of the transmitter, substantially as described.

20. The combination in a printing-telegraph system, of a transmitter having a member moving step by step for the sending of successive impulses to the receiver and an electromagnet controlling the step-by-step movement of said member, a receiver having a rotary type-wheel, mechanism for rotating said type-wheel, and an electromagnet by the movement of whose armature the rotation of the type-wheel is stopped, circuits to said magnets controlled each by a contact maker and breaker actuated at the end of the movement of the armature of the other of said magnets, and means whereby the circuit to said magnet of the receiver is broken by the return movement of said member of the transmitter, substantially as described.

21. The combination in a printing-telegraph system, of a receiver, a transmitter having a member moving step by step for the sending of successive impulses to the receiver, a circuit over which said impulses are sent, a contact-maker breaking said circuit on the return movement of said member of the transmitter, an electromagnet and connections for giving said member its step-by-step movement, and a circuit to said magnet controlled by the movement of a member of the receiver and passing through said contact-maker, substantially as described.

22. The combination with a printing-telegraph receiver, of a transmitter normally out of circuit with the receiver and having a member moving step by step for the sending of successive impulses to the receiver, means for connecting the transmitter and receiver in circuit on the actuation of the transmitter and for breaking circuit between the transmitter and receiver on the return movement of said member of the transmitter, an electromagnet controlling the step-by-step movement of said member of the transmitter, and a circuit to said magnet controlled by the movement of a member of the receiver, substantially as described.

23. The combination in a printing-telegraph receiver, of a rotary type-wheel, means for rotating said type-wheel, a sunflower having segments corresponding to the characters on the type-wheel and to which impulses are sent according to the characters to be recorded, a trailer moving with the type-wheel over the segments of the sunflower, and an electromagnet in electrical connection with said trailer and by the movement of whose armature the rotary movement of the type-wheel is stopped, substantially as described.

24. The combination in a printing-telegraph receiver, of a rotary type-wheel, mechanism for giving the type-wheel a step-by-step rotation, a sunflower having segments corresponding to the characters on the type-wheel and to which impulses are sent according to the characters to be recorded, a trailer moving with the type-wheel over the segments of the sunflower, and an electromagnet in electrical connection with said trailer and by the movement of whose armature the rotary movement of the type-wheel is stopped, substantially as described.

25. The combination in a printing-telegraph receiver, of a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel and to which impulses are sent according to the characters to be recorded, a trailer moving with the type-wheel over the segments of the sunflower, and an electromagnet in electrical connection with said trailer and by the movement of whose armature the circuit to the motor-magnets is broken to deënergize the motor-magnets, substantially as described.

26. The combination in a printing-telegraph receiver, of a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel and to which impulses are sent according to the characters to be recorded, a trailer moving with the type-wheel over the segments of the sunflower, an electromagnet in electrical connection with said trailer and by the movement of whose armature the circuit to the motor-magnets is broken to deënergize the motor-magnets, and impression mechanism controlled by the movement of the armature of said magnet, substantially as described.

27. The combination in a printing-telegraph receiver, of a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel and to which impulses are sent according to the characters to be recorded, a trailer moving with the type-wheel over the segments of the sunflower, an electromagnet in electrical connection with said trailer and by the movement of whose armature the circuit to the motor-magnets is broken to deënergize the motor-magnets, and spacing mechanism and impression mechanism controlled by the movement of the armature of said magnet, substantially as described.

28. The combination in a printing-telegraph receiver, of a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, an electromagnet in electrical connection with said trailer and by the movement of whose armature the circuit to the motor-magnets is broken to deënergize the motor-magnets, impression mechanism actuated by a second magnet, and a local circuit to the second said magnet closed by the movement of the armature of the first said magnet, substantially as described.

29. The combination in a printing-telegraph receiver, of a rotary type-wheel, mechanism for giving the type-wheel a step-by-step rotation including a star-wheel and anchor-pawl and one or more electromagnets reciprocating the anchor-pawl, a sunflower having segments corresponding to the characters on the type-wheel, a trailer moving with the type-wheel over the segments of the sunflower, an electromagnet in electrical connection with said trailer and by the movement of whose armature the circuit to the motor-magnets is broken to deënergize the motor-magnets, spacing mechanism controlled by the movement of the armature of said magnet, impression mechanism actuated by a second magnet, and a local circuit to the second said magnet closed by the movement of the armature of the first said magnet, substantially as described.

30. The combination in a printing-telegraph receiver, of a rotary type-wheel, means for giving said type-wheel a step-by-step rotation, an electromagnet the movement of whose armature stops the rotation of the type-wheel, and means controlled according to the movement of the type-wheel whereby circuit is completed for the energizing of said magnet to cause a movement of its armature by an impulse sent to the receiver when the type-wheel is positioned to record the character corresponding to said impulse, substantially as described.

31. The combination in a printing-telegraph receiver, of a rotary type-wheel, means for giving said type-wheel a step-by-step rotation, an electromagnet the movement of whose armature stops the rotation of the type-wheel, means controlled according to the movement of the type-wheel whereby circuit is completed for the energizing of said magnet to cause a movement of its armature by an impulse sent to the receiver when the type-wheel is positioned to record the character corresponding to said impulse, and impression mechanism controlled by the movement of the armature of said magnet, substantially as described.

32. The combination in a printing-telegraph receiver, of a rotary type-wheel, electric-motor mechanism for rotating the type-wheel, an electromagnet by the movement of whose armature the circuit to the motor mechanism is broken to deënergize the motor mechanism, and means controlled according to the movement of the type-wheel whereby circuit is completed for the energizing of said magnet to cause a movement of its armature by an impulse sent to the receiver when the type-wheel is positioned to record the character corresponding to said impulse, substantially as described.

33. The combination in a printing-telegraph receiver, of a rotary type-wheel, mechanism for giving the type-wheel a step-by-step rotation including a star-wheel and anchor-pawl and one or more electromagnets reciprocating the anchor-pawl, an electromagnet by the movement of whose armature the circuit to the motor-magnets is broken to deënergize the motor-magnets, and means controlled according to the movement of the type-wheel whereby circuit is completed for the energizing of said magnet to cause a movement of its armature by an impulse sent to the receiver when the type-wheel is positioned to record the character corresponding to said impulse, substantially as described.

34. The combination of the rotary type-wheel 100 splined on the shaft 102, means for rotating said shaft for positioning the type-wheel according to the character to be recorded, a racked feed-bar 135 mounted to move endwise parallel with the shaft 102, an arm carried by the feed-bar and engaging the type-wheel to move it longitudinally of the shaft 102 for letter-spacing, a mutilated pinion engaging the rack of the feed-bar, means for giving said pinion a step-by-step rotation, and means for returning the feed-bar when the mutilated portion of the pinion comes opposite the rack, substantially as described.

35. The combination of a rotary type-wheel, means for rotating the type-wheel according to the character to be recorded, a rack, a mutilated pinion engaging said rack to move the type-wheel longitudinally of its axis for letter-spacing, means for giving said pinion a step-by-step rotation, and means for returning the type-wheel when the mutilated portion of the pinion comes opposite the rack, substantially as described.

36. In a telegraph-transmitter, the combination of a series of contact-fingers, means controlled by an electromagnet for moving past said fingers a check having finger-operating devices arranged to cause the contact-fingers to make contact successively according to the impulses to be sent, and means controlled by said magnet for sending a series of impulses after the sending of the impulses by the operating devices of the check has been completed, substantially as described.

37. In a telegraph-transmitter, the combination of a carriage for operating checks having contact-finger-operating devices arranged according to the impulses to be sent, an electromagnet and connections for giving said carriage a step-by-step movement, a contact moving with the carriage, and a series of contacts with which the contact moving with the carriage engages as the step-by-step movement of the carriage is continued after the sending of the impulses by the operating devices of the check has been completed, substantially as described.

38. In a telegraph-transmitter, the combination with a member moving step by step for the sending of successive impulses, an electromagnet and connections for giving said member its step-by-step movement, and a contact-breaking circuit to said magnet on the return movement of said moving member, substantially as described.

39. In a telegraph-transmitter, the combination of a series of contact-fingers under tension to make contact having arms extending into the path of operating-checks formed with openings or depressions arranged according to the impulses to be sent, a carriage for said checks, an electromagnet and connections for giving said carriage a step-by-step movement, a contact moving with said carriage, a series of contacts with which the contact moving with the carriage engages as the carriage continues its movement after the last of the openings in the operating-check have been moved past the arms of the contact-fingers, and a member engaging the contact-fingers before the operating-plate is moved beyond the said arms of the contact-fingers to hold said fingers out of contact during the further movement of the carriage, substantially as described.

40. The combination in a telegraph-transmitter having a moving member and means controlled by the movement of said member for the sending of successive impulses, of a spring-contact moving with said member, a contact-plate, and a guide for holding the spring-contact against the contact-plate during the advance movement of said member, said guide being of such a length that before the member reaches the end of its movement the contact will be carried out of engagement with said guide, and said contact-plate and guide being inclined so that before the contact is carried out of engagement with the guide it will be under tension to move away from the contact-plate, substantially as described.

41. The combination in a telegraph-transmitter having a moving member and means controlled by the movement of said member for the sending of successive impulses, of a contact moving with said member and under spring tension when said member is in its normal position to make contact with a contact-plate, said contact-plate, a detent normally holding said contact out of contact with said contact-plate, means for releasing said contact on the actuation of the transmitter, and a guide for holding said contact against said contact-plate during the advance movement of said member, said guide being of such a length that before the member reaches the end of its movement the contact will be carried out of engagement with said guide, and said contact-plate and guide being inclined so that before the contact is carried out of engagement with the guide it will be under tension to move away from the contact-plate, substantially as described.

42. The combination in a telegraph-transmitter having a moving member and means controlled by the movement of said member for the sending of successive impulses, of a contact moving with said member, a contact-plate, means for holding said contact out of contact with said contact-plate when said member is in its normal position and for bringing said contact into contact with said contact-plate on the actuation of the transmitter, and means for holding said contact in contact with said contact-plate during the advance movement of said member and for holding said contact out of contact with said contact-plate during the return movement of said member, substantially as described.

43. The combination in a telegraph-transmitter, of a member, means for giving said member a step-by-step movement, a contact moving with said member and engaging a contact-plate on the actuation of the transmitter, means controlled by the step-by-step movement of said member for sending successive impulses during the time that said contact engages said contact-plate, and a series of contacts beyond said contact-plate with which said contact moving with said member engages in the further movement of said member, substantially as described.

44. The combination in a telegraph-transmitter, of a moving member, a contact moving with said member and engaging a contact-plate on the actuation of the transmitter, means controlled by the movement of said member for sending successive impulses during the time that said contact engages said contact-plate, and a series of contacts beyond said contact-plate with which said contact moving with said member engages in the further movement of said member, substantially as described.

45. The combination of the series of contact-fingers 10, check-carriage 25, main switch K, magnet CM and connections for giving the carriage a step-by-step movement, and contact maker and breaker 70 actuated at the end of the movement in either direction of the armature of the magnet CM, substantially as described.

46. The combination of the series of contact-fingers 10, check-carriage 25, a spring-contact moving with the carriage 25, inclined contact-plate 46, inclined guide 59, and means for feeding the carriage for transmitting and for returning the carriage to normal position, substantially as described.

47. The combination of the series of contact-fingers 10, check-carriage 25, a spring-contact moving with the carriage 25, contact-plate 46, stop 52 holding said spring-contact away from contact-plate 46 when the carriage is in its normal position, means for moving the stop to release the spring-contact on the check being dropped into position on the carriage, and means for feeding the carriage for transmitting and for returning the carriage to normal position, substantially as described.

48. The combination of the series of contact-fingers 10, check-carriage 25, means for giving the carriage a step-by-step movement and for returning the carriage to normal position, a spring-contact moving with the check-carriage, inclined contact-plate 46, inclined guide 59, a series of contacts with which said spring-contact engages when moved beyond the contact-plate 46, and a stop 52 engaging the spring-contact to hold it away from the contact-plate 46 on the completion of the return movement of the carriage, substantially as described.

49. The combination in a telegraph-transmitter, of the series of contact-fingers 10, check-carriage 25, contact-plate 46, a spring-contact moving with the carriage and engaging said contact-plate to establish a circuit for the sending of impulses by the transmitter, a series of contacts engaged by said spring-contact when it has been carried by the movement of the carriage beyond the contact-plate 46, a contact-spring 67 moved by the action of the carriage to engage contact 68 to complete the circuit for the sending of impulses by the transmitter when the circuit through the contact-plate 46 is broken by the movement of the contact-spring from the contact-plate 46 to the said series of contacts, substantially as described.

50. The combination of the series of contact-fingers 10, check-carriage 25, and stop 60 for said contact-fingers actuated by the movement of the carriage after the completion of the actuation of said contact-fingers by the operating-check, substantially as described.

51. The combination of the contact-spring 47, spring-bar 48 carried by a moving member, inclined contact-plate 46, and inclined guide 59, substantially as described.

52. The combination of the contact-spring 47, spring-bar 48 carried by a moving member, inclined contact-plate 46, inclined guide 59, and stop 52, substantially as described.

53. The combination of the contact-spring 47 carried by a moving member, inclined contact-plate 46, inclined guide 59, and stop 52, substantially as described.

54. The combination in a time switch or commutator, of two or more concentric circular series of contacts, a trailer moving over the contacts of each of said series, a spindle carrying one or more of said trailers, means for giving said spindle a step-by-step rotation, a sleeve mounted on said spindle and carrying one or more of said trailers, and means controlled by the rotation of said spindle for giving said sleeve a step-by-step rotation one step for each complete rotation of said spindle, substantially as described.

55. The combination in a time switch or commutator, of four concentric circular series of contacts, a trailer moving over the contacts of each of said series, a spindle carrying two of said trailers, means for giving said spindle a step-by-step rotation, a sleeve mounted on said spindle and carrying the other two of said trailers, and means controlled by the rotation of said spindle for giving said sleeve a step-by-step rotation one step for each complete rotation of the spindle, substantially as described.

56. The combination in a time switch or commutator, of two or more concentric circular series of contacts, a trailer moving over the contacts of each of said series, a spindle carrying one or more of said trailers, an electromagnet and connections for giving said spindle a step-by-step rotation, a sleeve carrying one or more of said trailers, and means controlled by the rotation of said spindle for rotating said sleeve one step for each complete rotation of the spindle, substantially as described.

57. The combination in a time switch or commutator, of the series of contacts $T'$, $T^2$, $T^3$, $T^4$, trailers $Q'$, $Q^2$, $Q^3$, $Q^4$, means for giving the trailers $Q^3$ and $Q^4$ a step-by-step rotation such that they make a complete rotation of sixty steps in an hour, and means for giving the trailers $Q'$, $Q^2$ a step-by-step rotation such that they move one step for each complete rotation of the trailers $Q^3$, $Q^4$, substantially as described.

58. The combination of a time switch or commutator, having a series of contacts corresponding to the times to be recorded and a trailer moving over said contacts, recording mechanism, and circuit connections between said recording mechanism and a transmitting mechanism including a line from the said transmitting mechanism to the trailer of the time-commutator and a series of lines extending respectively between the several contacts of the time-commutator and the recording mechanism, substantially as described.

59. The combination of a time switch or commutator having a series of contacts corresponding to the times to be recorded, a trailer moving over said contacts, electrical connections to said trailer for sending an impulse or impulses through the time-commutator, a magnet and connections for giving the trailer a step-by-step movement to cause it to engage the contacts successively, and a circuit to said magnet controlled by a contact-maker operating at given intervals, means for sending an impulse to the commutator; and mechanism electrically connected with said contacts whereby a record is made of the time at which an impulse is received from the time-commutator, substantially as described.

60. The combination of a time switch or commutator having four series of contacts corresponding respectively to the first and second figures for hours and the first and second figures for minutes, and a trailer for each series, means for moving said trailers to make contact with the respective series of contacts according to the time, means for sending impulses to said trailers successively, and mechanism electrically connected with said contacts for recording the time according to the impulses received from the time-commutator, substantially as described.

61. The combination with a time switch or commutator having a series of contacts corresponding to the times to be recorded and a trailer moving over said contacts, of receiving mechanism having a rotary type-wheel, means for rotating said type-wheel, a sunflower having segments corresponding to the characters on the type-wheel and in electrical connection with the contacts of the time-commutator, a trailer moving with the type-wheel over the segments of the sunflower, and an electromagnet in electrical connection with said trailer and by the movement of whose armature the rotary movement of the type-wheel is stopped, substantially as described.

62. The combination with a time switch or commutator having four series of contacts corresponding respectively to the first and second figures for hours and the first and second figures for minutes and a trailer moving over the contacts of each series of contacts, of receiving mechanism having a rotary type-wheel, means for rotating said type-wheel, a sunflower having segments corresponding to the characters on the type-wheel and in electrical connection with the contacts of the time-commutator, a trailer moving with the type-wheel over the segments of the sunflower, and an electromagnet in electrical connection with said trailer and by the movement of whose armature the rotary movement of the type-wheel is stopped, substantially as described.

63. The combination with a time switch or commutator having four series of contacts corresponding respectively to the first and second figures for hours and the first and second figures for minutes, a trailer moving over the contacts of each series of contacts, and means for giving said trailers a step-by-step rotation, the trailers making contact with the two series for hours moving one step for each complete rotation of the trailers making contact with the series for minutes, of receiving mechanism having a rotary type-wheel, means for rotating said type-wheel, a sunflower having segments corresponding to the characters on the type-wheel and in electrical cnonection with the contacts of the time-commutator, a trailer moving with the type-wheel over the segments of the sunflower, and an electromagnet in electrical connection with said trailer and by the movement of whose armature the rotary movement of the type-wheel is stopped, substantially as described.

64. The combination in a printing-telegraph system, of a receiver, a time-commutator, having a series of contacts corresponding to the times to be recorded, and a transmitter acting to send a succession of impulses to the receiver to cause the recording of the number or other message and to send one or more impulses through the time-commutator to the receiver to cause the recording of the time, substantially as described.

65. The combination in a printing-telegraph system, of a receiver, a time-commutator, and a transmitter having a series of contact-fingers making contact for sending impulses to the receiver, a carriage for carrying past said contact-fingers operating-checks formed to actuate said contact-fingers in succession according to the characters to be recorded by the receiver, and means operating after the completion of the sending of impulses by said contact-fingers under the control of the operating-check to send one or more impulses to the receiver through the time-commutator, substantially as described.

66. The combination in a printing-telegraph system, of a receiver, a time-commutator, and a transmitter having a series of contact-fingers making contact for sending impulses to the receiver, a carriage for carrying past said contact-fingers operating-checks formed to actuate said contact-fingers in succession according to the characters to be recorded by the receiver, and means operated by the further movement of the carriage after the completion of the sending of impulses by said contact-fingers under the control of the operating-check to send one or more impulses to the receiver through the time-commutator, substantially as described.

67. The combination in a printing-telegraph system, of a receiver, a time-commutator having four series of contacts corresponding respectively to the first and second figures for hours and the first and second figures for minutes, said contacts being connected with the receiver, and a trailer for each series of contacts, and a transmitter having a series of contact-fingers making contact for sending impulses to the receiver, a carriage for carrying past said contact-fingers operating-checks formed to actuate said contact-fingers in succession according to the characters to be recorded by the receiver, and means operating after the completion of the sending of impulses by said contact-fingers under the control of the operating-check to send an impulse to each of the trailers of the time-commutator, substantially as described.

68. An operating-check for telegraph-transmitters having devices arranged to actuate contact-fingers in order for sending successive impulses according to the characters to be recorded and having a positioning device 22 projecting from one face of the check, substantially as described.

69. An operating-check for telegraph-transmitters formed of a plate having openings o arranged to actuate contact-fingers in order for sending successive impulses according to the characters to be recorded, and having a positioning device 22 projecting from one face of the check, substantially as described.

In testimony whereof I have hereunto set my hand in the presence of two subscribing witnesses.

WESLEY TRAFFORD.

Witnesses:
   A. L. KENT,
   G. M. BORST.